United States Patent
Vajapeyam et al.

(10) Patent No.: US 9,356,725 B2
(45) Date of Patent: May 31, 2016

(54) METHOD AND APPARATUS FOR MANAGING INTER-CELL INTERFERENCE COORDINATION ACTIONS FOR TIME-DOMAIN PARTITIONED CELLS

(75) Inventors: Madhavan Srinivasan Vajapeyam, San Diego, CA (US); Aleksandar Damnjanovic, Del Mar, CA (US); Juan Montojo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 369 days.

(21) Appl. No.: 13/267,355

(22) Filed: Oct. 6, 2011

(65) Prior Publication Data

US 2012/0087266 A1    Apr. 12, 2012

Related U.S. Application Data

(60) Provisional application No. 61/391,532, filed on Oct. 8, 2010.

(51) Int. Cl.
*H04J 1/16* (2006.01)
*H04J 11/00* (2006.01)
(Continued)

(52) U.S. Cl.
CPC ........... *H04J 11/0056* (2013.01); *H04W 72/08* (2013.01); *H04W 28/0231* (2013.01); *H04W 28/0236* (2013.01); *H04W 28/0242* (2013.01); *H04W 28/08* (2013.01); *H04W 52/0235* (2013.01); *H04W 52/0238* (2013.01); *H04W 52/24* (2013.01); *H04W 52/241* (2013.01);
(Continued)

(58) Field of Classification Search
CPC . H04W 72/08; H04W 72/082; H04W 72/085; H04W 72/1231; H04W 28/0231; H04W 28/0236; H04W 28/0242; H04W 28/08; H04W 52/0235; H04W 52/0238; H04W 52/24; H04W 52/241–52/245
USPC .......................................... 370/252, 328, 468
See application file for complete search history.

(56) References Cited

U.S. PATENT DOCUMENTS 6,504,837 B1 * 1/2003 Menzel .......................... 370/351
6,983,165 B1 * 1/2006 Hiramatsu .................... 455/522
(Continued)

FOREIGN PATENT DOCUMENTS

WO    WO2011034966 A1    3/2011

OTHER PUBLICATIONS

International Search Report and Written Opinion—PCT/US2011/055189—ISA/EPO—Jan. 9, 2012.
(Continued)

*Primary Examiner* — Peter Cheng
(74) *Attorney, Agent, or Firm* — Norton Rose Fulbright US LLP

(57) ABSTRACT

Aspects of the present disclosure relate generally to wireless communication systems, and more particularly, to systems and methods for managing inter-cell interference coordination (ICIC) actions for time-domain partitioned cells. In certain aspects, time-domain partitioning is accounted for by an ebb in determining whether to send frequency-based inter-cell interference information (e.g., uplink overload indicator) to neighboring ebb(s) and/or responsive actions to take in response to receiving frequency-based inter-cell interference information (e.g., uplink overload indicator, high interference indicator, and/or relative narrowband transmission power).

42 Claims, 11 Drawing Sheets

(51) Int. Cl.
| | |
|---|---|
| *H04W 72/08* | (2009.01) |
| *H04W 52/02* | (2009.01) |
| *H04W 28/02* | (2009.01) |
| *H04W 52/24* | (2009.01) |
| *H04W 72/12* | (2009.01) |
| *H04W 28/08* | (2009.01) |

(52) U.S. Cl.
CPC .......... *H04W72/082* (2013.01); *H04W 72/085* (2013.01); *H04W 72/1231* (2013.01)

(56) References Cited

U.S. PATENT DOCUMENTS

| | | | |
|---|---|---|---|
| 8,355,373 B2* | 1/2013 | Gandham et al. | 370/329 |
| 2006/0223446 A1* | 10/2006 | Dominique et al. | 455/69 |
| 2007/0274320 A1* | 11/2007 | Joshi et al. | 370/395.2 |
| 2009/0179755 A1* | 7/2009 | Bachl | H04W 72/082 340/540 |
| 2009/0310555 A1* | 12/2009 | Huo et al. | 370/329 |
| 2010/0182903 A1 | 7/2010 | Palanki et al. | |
| 2010/0220670 A1 | 9/2010 | Teo et al. | |
| 2010/0267408 A1* | 10/2010 | Lee et al. | 455/509 |
| 2011/0003598 A1 | 1/2011 | Ma et al. | |
| 2011/0045856 A1* | 2/2011 | Feng et al. | 455/501 |
| 2011/0081865 A1 | 4/2011 | Xiao et al. | |

OTHER PUBLICATIONS

Nokia Siemens Networks: "X2 interface proxy at DeNB", 3GPP Draft; R3-101662 X2 Proxy Relay, 3rd Generation Partnership Project (3GPP), Mobile Competence Centre ; 650, Route Des Lucioles ; F-06921 Sophia-Antipolis Cedex ; France, vol. RAN WG3, No. Montreal, Canada; May 10, 2010, May 1, 2010, XP050425399, [retrieved on May 11, 2010 the whole document.

NTT DoCoMo: "Downlink Interference Coordination Between eNodeB and Home eNodeBM", 3GPP Draft; R4-093203, 3rd Generation Partnership Project (3GPP), Mobi le Competence Centre ; 650, Route Des Lucioles ; F-06921 Sophia-Antipolis Cedex ; France, No. Shenzhen, China; Aug. 18, 2009, XP050354272, [retrieved on Aug. 18, 2009] the whole document.

Qualcomm Incorporated: "Data channel ICIC and the benefits of possible extensions", 3GPP Draft; R1-103562 Data Channel ICIC and the Benefits of Possible Extensions, 3rd Generation Partnership Project (3GPP), Mobile Competence Centre ; 650, Route Des Lucioles ; F-06921 Sophia-Anti polis Cedex ; France, vol. RAN WG1, No. Dresden, Germany; Jun. 28, 2010, Jun. 22, 2010, XP050449060, [retrieved on Jun. 22, 2010] the whole document.

Qualcomm Incorporated: "Enabling communication in harsh interference scenarios", 3GPP Draft; R1-103560 Enabling Communication in Harsh Interference Scenarios, 3rd Generation Partnership Project (3GPP), Mobi le Competence Centre ; 650, Route Des Lucioles ; F-06921 Sophia-Antipolis Cedex ; France, vol. RAN WG1, No. Dresden, Germany; Jun. 28, 2010, Jun. 25, 2010, XP050449529, [retrieved on Jun. 25, 2010] the whole document.

Qualcomm Incorporated: "Enhanced interference management for co-channel support of HetNet", 3GPP Draft; R1-101504 Enhanced Interference Management for Co-Channel Support of Hetnet, 3rd Generation Partnershi p Project (3GPP), Mobi le Competence Centre ; 650, Route Des Lucioles ; F-06921 Sophia-Anti polis Cedex ; France, [Online] vol. RAN WG1, No. Sam Francisco, CA USA, Feb. 22, 2010, pp. 113-313, XP002666275, Retrieved from the Internet: URL: http://www.3gpp.org/ftp/tsg- ran/wgl-rl1/TSGR1_60/Docs/R1-101504.zip> [retrieved on Dec. 22, 2011] the whole document.

Qualcomm Incorporated: "Extending Rel-8/9 ICIC into Rel-10", 3GPP Draft; R1-101505 Extending Rel-8-9 ICIC Into Rel-10, 3rd Generation Partnership Project (3GPP), Mobile Competence Centre ; 650, Route Des Lucioles ; F-06921 Sophia-Antipolis Cedex ; France, vol. RAN WG1, No. San Francisco, USA; Feb. 22, 2010, Feb. 16, 2010, XP050418951, [retrieved on Feb. 16, 2010].

NTT DoCoMo: "Views on eICIC Schemes for Rel-10," 3GPP TSG RAN WG1 Meeting #62bis, R1-105442, pp. 1-9, Oct. 2010.

Qualcomm: "Details of time-domain extension of Rel-8/9 backhaul-based ICIC", 3GPP TSG-RAN WG1 #62bis R1-105587,Oct. 5, 2010, pp. 1-12. URL,http://www.3gpp.org/ftp/tsg_ran/wg1_rl1/TSGR1_62b/Docs/R1-105587.zip.

Huawei, et al., "The possible restrictions on the configuration of almost blank subframes in Macro-Pico deployments", 3GPP Draft; R1-105150 The Possible Restrictions on the Configuration of Almost Blank Subframes in Macro-Pi co Deployments_Vo 5, 3rd Generation Partnership Project (3GPP), Mobile Competence Centre ; 650, Route Des Lucioles ; F-06921 Sophia-Antipolis CE, vol. RAN WG1, Oct. 5, 2010, XP050450368, pp. 1-5.

Huawei: Impacts of eICIC on RRM requirements, 3GPP TSG-RAN WG4#56, R4-103008, URL: http://www.3gpp.org/ftp/tsg_ran/WG4_Radio/TSGR4_56/Documents/R4-103008.zip, Aug. 17, 2010, 3 Pages.

Qualcomm Europe, "Details on inter-cell interference coordination", 3GPP Draft; R1-080491, 3rd Generation Partnership Project (3GPP), Mobile Competence Centre; 650, Route Des Lucioles; F-06921 Sophia-Antipolis Cedex; France, val. RAN WG1, No. Sevilla, Spain; Jan. 14, 2007-Jan. 18, 2007, Jan. 9, 2008, XP050596605, [retrieved on Jan. 9, 2008].

* cited by examiner

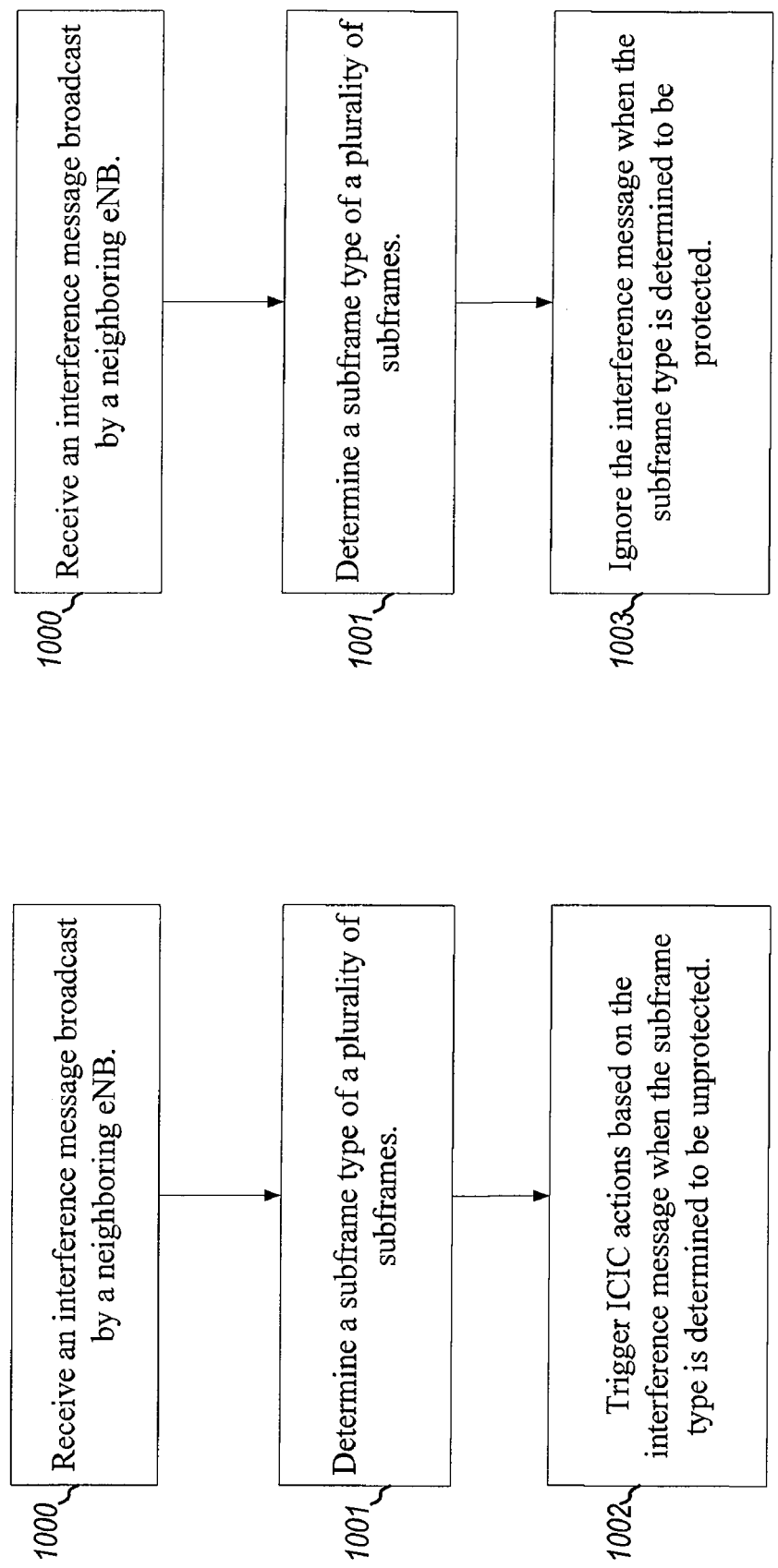

METHOD AND APPARATUS FOR MANAGING INTER-CELL INTERFERENCE COORDINATION ACTIONS FOR TIME-DOMAIN PARTITIONED CELLS

CROSS-REFERENCE TO RELATED APPLICATIONS

This application claims the benefit of U.S. Provisional Patent Application No. 61/391,532, entitled, "METHOD AND APPARATUS FOR MANAGING INTER-CELL INTERFERENCE COORDINATION ACTIONS FOR TIME-DOMAIN PARTITIONED CELLS", filed on Oct. 8, 2010, which is expressly incorporated by reference herein in its entirety.

BACKGROUND

1. Field

Aspects of the present disclosure relate generally to wireless communication systems, and more particularly, to systems and methods for managing inter-cell interference coordination (ICIC) actions for time-domain partitioned cells. In certain aspects, time-domain partitioning is accounted for by an eNB in determining whether to send frequency-based inter-cell interference information (e.g., uplink overload indicator) to neighboring eNB(s) and/or responsive actions to take in response to receiving frequency-based inter-cell interference information (e.g., uplink overload indicator, high interference indicator, and/or relative narrowband transmission power).

2. Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance the UMTS technologies not only to meet the growing demand for mobile broadband access, but to advance and enhance the user experience with mobile communications.

SUMMARY

This invention relates generally to wireless communication systems, and more particularly, to systems and methods for managing inter-cell interference coordination (ICIC) actions for time-domain partitioned cells by generating and sending interference information (e.g., uplink overload indicator) to neighboring eNB(s) and/or responsive actions to take in response to receiving interference information.

In one aspect of the disclosure, a method for wireless communication by an eNB that includes measuring interference over a plurality of subframes, identifying each usable subframe, and communicating an interference message when the measured interference associated with an identified usable subframe exceeds a threshold value.

In an additional aspect of the disclosure, a method for wireless communication by an eNB that includes receiving an interference message broadcast by a neighboring eNB, determining a subframe type of a plurality of subframes, and triggering ICIC actions based on the interference message when the subframe type is determined to be unprotected.

In an additional aspect of the disclosure, an apparatus for wireless communication that includes means for measuring interference over a plurality of subframes, means for identifying each usable subframe, and means for communicating an interference message when the measured interference associated with an identified usable subframe exceeds a threshold value.

In an additional aspect of the disclosure, an apparatus for wireless communication that includes means for receiving an interference message broadcast by a neighboring eNB, means for determining a subframe type of a plurality of subframes, and means for triggering ICIC actions based on the interference message when the subframe type is determined to be unprotected.

In an additional aspect of the disclosure, a computer program product has a non-transitory computer-readable medium having program code recorded thereon. This program code includes code to measure interference over a plurality of subframes, code to identify each usable subframe, and code to communicate an interference message when the measured interference associated with an identified usable subframe exceeds a threshold value.

In an additional aspect of the disclosure, a computer program product has a non-transitory computer-readable medium having program code recorded thereon. This program code includes code to receive an interference message broadcast by a neighboring eNB, code to determine a subframe type of a plurality of subframes, and code to trigger ICIC actions based on the interference message when the subframe type is determined to be unprotected.

In an additional aspect of the disclosure, an apparatus configured for wireless communication includes at least one processor and a memory coupled to the processor. The processor is configured to measure interference over a plurality of subframes, to identify each usable subframe, and to communicate an interference message when the measured interference associated with an identified usable subframe exceeds a threshold value.

In an additional aspect of the disclosure, an apparatus configured for wireless communication includes at least one processor and a memory coupled to the processor. The processor is configured to receive an interference message broadcast by a neighboring eNB, to determine a subframe type of the subframes, and to trigger ICIC actions based on the interference message when the subframe type is determined to be unprotected.

BRIEF DESCRIPTION OF THE DRAWINGS

FIG. 10A is a functional block diagram conceptually illustrating example blocks executed to implement one aspect of the present disclosure.

FIG. 10B is a functional block diagram conceptually illustrating example blocks executed to implement one aspect of the present disclosure.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

The techniques described herein may be used for various wireless communication networks such as CDMA, TDMA, FDMA, OFDMA, SC-FDMA and other networks. The terms "network" and "system" are often used interchangeably. A CDMA network may implement a radio technology, such as Universal Terrestrial Radio Access (UTRA), Telecommunications Industry Association's (TIA's) CDMA2000®, and the like. The UTRA technology includes Wideband CDMA (WCDMA) and other variants of CDMA. The CDMA2000® technology includes the IS-2000, IS-95 and IS-856 standards from the Electronics Industry Alliance (EIA) and TIA. A TDMA network may implement a radio technology, such as Global System for Mobile Communications (GSM). An OFDMA network may implement a radio technology, such as Evolved UTRA (E-UTRA), Ultra Mobile Broadband (UMB), IEEE 802.11 (Wi-Fi), IEEE 802.16 (WiMAX), IEEE 802.20, Flash-OFDMA, and the like. The UTRA and E-UTRA technologies are part of Universal Mobile Telecommunication System (UMTS). 3GPP Long Term Evolution (LTE) and LTE-Advanced (LTE-A) are newer releases of the UMTS that use E-UTRA. UTRA, E-UTRA, UMTS, LTE, LTE-A and GSM are described in documents from an organization called the "3rd Generation Partnership Project" (3GPP). CDMA2000® and UMB are described in documents from an organization called the "3rd Generation Partnership Project 2" (3GPP2). The techniques described herein may be used for the wireless networks and radio access technologies mentioned above, as well as other wireless networks and radio access technologies. For clarity, certain aspects of the techniques are described below for LTE or LTE-A (together referred to in the alternative as "LTE/-A") and use such LTE/-A terminology in much of the description below.

Figure 1:
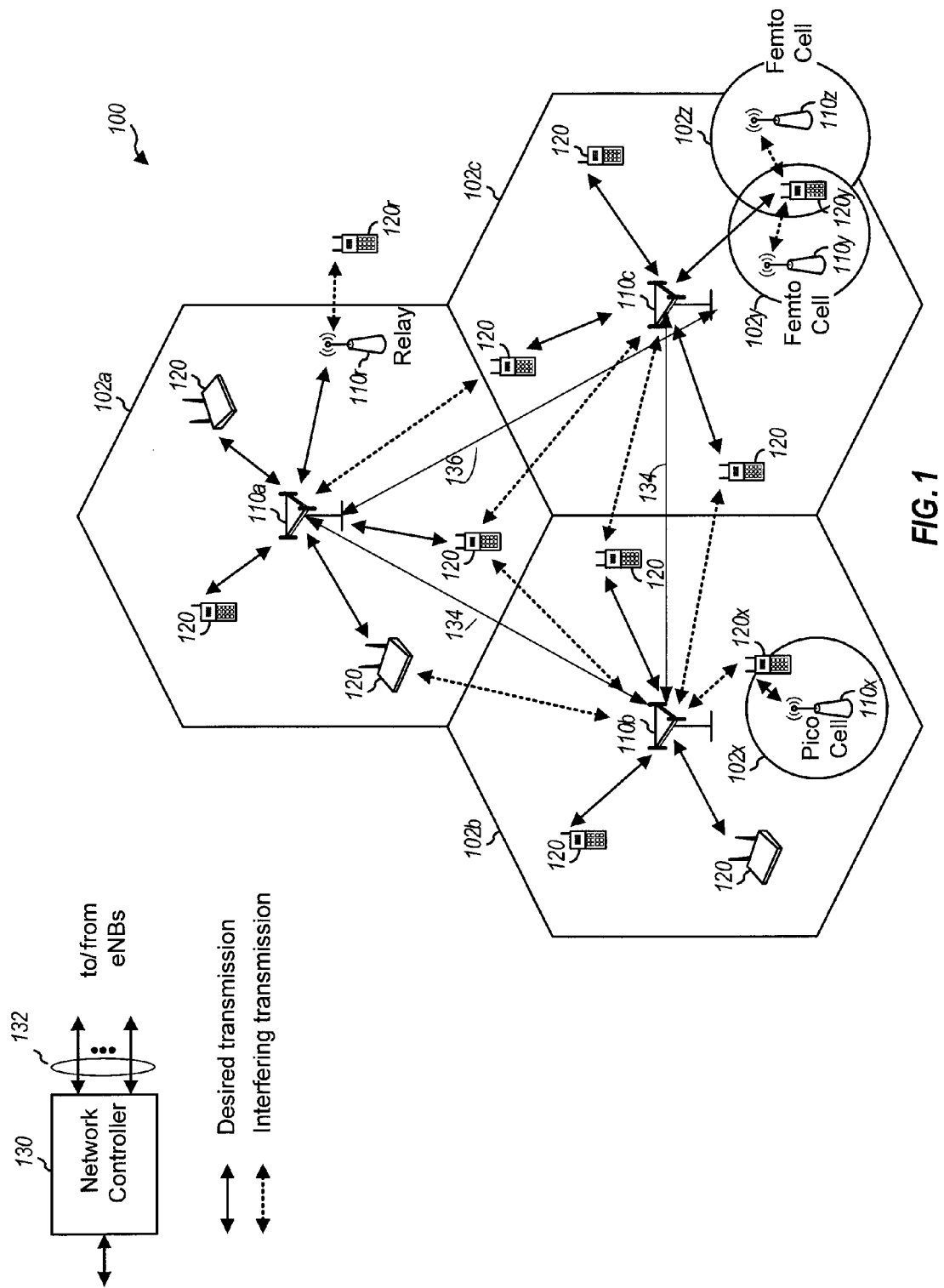
FIG. 1 is a block diagram conceptually illustrating an example of a mobile communication system.

FIG. 1 shows a wireless network 100 for communication, which may be an LTE-A network. The wireless network 100 includes a number of evolved node Bs (eNBs) 110 and other network entities. An eNB may be a station that communicates with the UEs and may also be referred to as a base station, a node B, an access point, and the like. Each eNB 110 may provide communication coverage for a particular geographic area. In 3GPP, the term "cell" can refer to this particular geographic coverage area of an eNB and/or an eNB subsystem serving the coverage area, depending on the context in which the term is used.

An eNB may provide communication coverage for a macro cell, a pico cell, a femto cell, and/or other types of cell. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. In the example shown in FIG. 1, the eNBs 110a, 110b and 110c are macro eNBs for the macro cells 102a, 102b and 102c, respectively. The eNB 110x is a pico eNB for a pico cell 102x. And, the eNBs 110y and 110z are femto eNBs for the femto cells 102y and 102z, respectively. An eNB may support one or multiple (e.g., two, three, four, and the like)

cells. The wireless network 100 also includes relay stations 110r that receives a transmission of data and/or other information from an upstream station (e.g., an eNB, a UE, or the like) and sends a transmission of the data and/or other information to a downstream station (e.g., another UE, another eNB, or the like).

The wireless network 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. Many of the techniques described herein are used for synchronous operations.

A network controller 130 may couple to a set of eNBs and provide coordination and control for these eNBs. The network controller 130 may communicate with the eNBs 110 via a backhaul 132. The eNBs 110 may also communicate with one another, e.g., directly or indirectly via a wireless backhaul 134 or a wireline backhaul 136.

The UEs 120 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a tablet computer, a handheld device, a laptop computer, a cordless phone, a wireless local loop (WLL) station, or the like. A UE may be able to communicate with macro eNBs, pico eNBs, femto eNBs, relays, and the like. In FIG. 1, a solid line with double arrows indicates desired transmissions between a UE and a serving eNB, which is an eNB designated to serve the UE on the downlink and/or uplink. A dashed line with double arrows indicates interfering transmissions between a UE and an eNB.

LTE/-A utilizes orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, or the like. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, K may be equal to 128, 256, 512, 1024 or 2048 for a corresponding system bandwidth of 1.25, 2.5, 5, 10 or 20 megahertz (MHz), respectively. The system bandwidth may also be partitioned into sub-bands. For example, a sub-band may cover 1.08 MHz, and there may be 1, 2, 4, 8 or 16 sub-bands for a corresponding system bandwidth of 1.25, 2.5, 5, 10 or 20 MHz, respectively.

Figure 2:
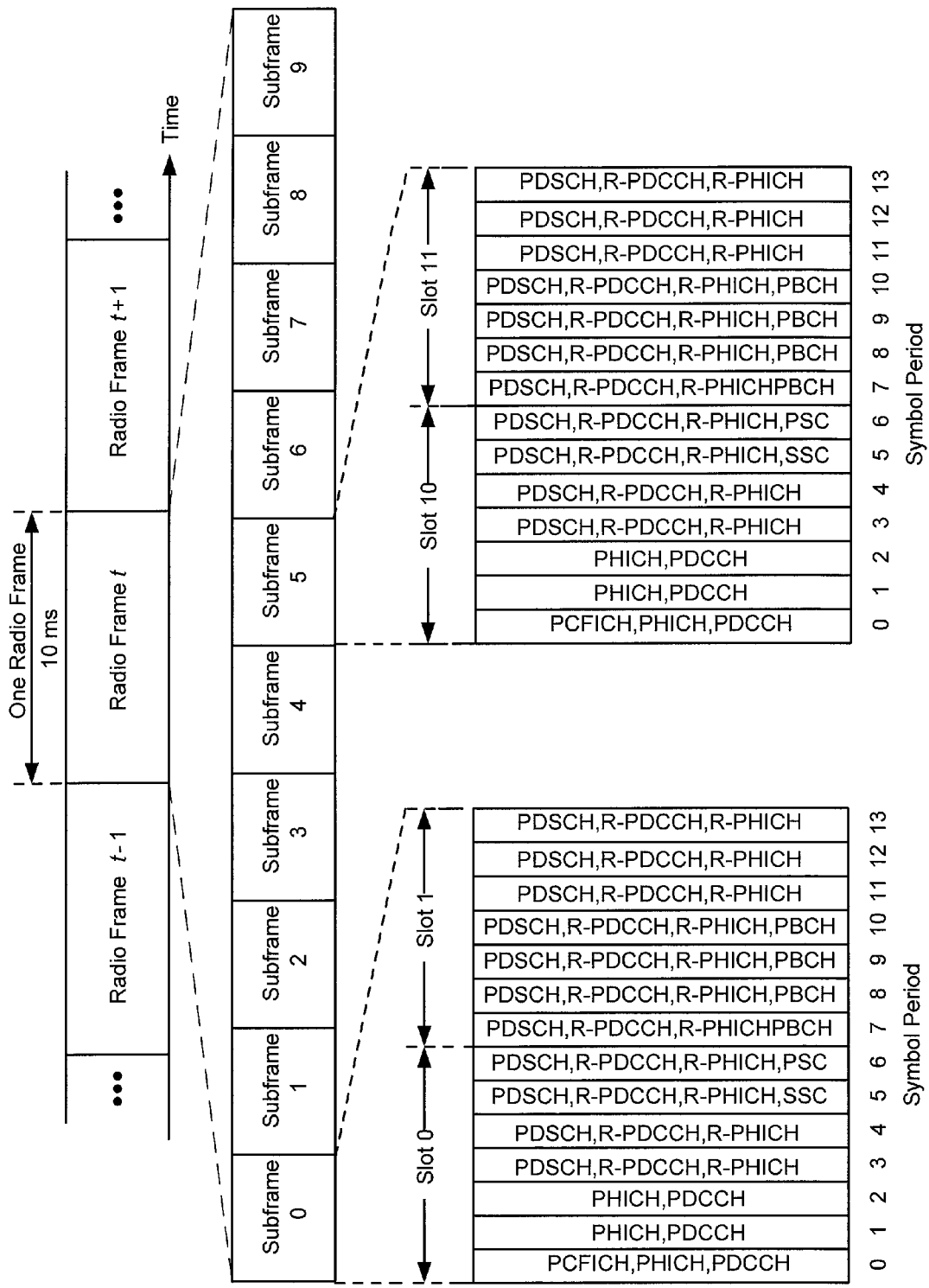
FIG. 2 is a block diagram conceptually illustrating an example of a downlink frame structure in a mobile communication system.

FIG. 2 shows a downlink frame structure used in LTE/-A. The transmission timeline for the downlink may be partitioned into units of radio frames. Each radio frame may have a predetermined duration (e.g., 10 milliseconds (ms)) and may be partitioned into 10 subframes with indices of 0 through 9. Each subframe may include two slots. Each radio frame may thus include 20 slots with indices of 0 through 19. Each slot may include L symbol periods, e.g., 7 symbol periods for a normal cyclic prefix (as shown in FIG. 2) or 6 symbol periods for an extended cyclic prefix. The 2L symbol periods in each subframe may be assigned indices of 0 through 2L-1. The available time frequency resources may be partitioned into resource blocks. Each resource block may cover N subcarriers (e.g., 12 subcarriers) in one slot.

In LTE/-A, an eNB may send a primary synchronization signal (PSS) and a secondary synchronization signal (SSS) for each cell in the eNB. The primary and secondary synchronization signals may be sent in symbol periods 6 and 5, respectively, in each of subframes 0 and 5 of each radio frame with the normal cyclic prefix, as shown in FIG. 2. The synchronization signals may be used by UEs for cell detection and acquisition. The eNB may send a Physical Broadcast Channel (PBCH) in symbol periods 0 to 3 in slot 1 of subframe 0. The PBCH may carry certain system information.

The eNB may send a Physical Control Format Indicator Channel (PCFICH) in the first symbol period of each subframe, as seen in FIG. 2. The PCFICH may convey the number of symbol periods (M) used for control channels, where M may be equal to 1, 2 or 3 and may change from subframe to subframe. M may also be equal to 4 for a small system bandwidth, e.g., with less than 10 resource blocks. In the example shown in FIG. 2, M=3. The eNB may send a Physical HARQ Indicator Channel (PHICH) and a Physical Downlink Control Channel (PDCCH) in the first M symbol periods of each subframe. The PDCCH and PHICH are also included in the first three symbol periods in the example shown in FIG. 2. The PHICH may carry information to support hybrid automatic retransmission (HARQ). The PDCCH may carry information on resource allocation for UEs and control information for downlink channels. The eNB may send a Physical Downlink Shared Channel (PDSCH) in the remaining symbol periods of each subframe. The PDSCH may carry data for UEs scheduled for data transmission on the downlink.

In addition to sending PHICH and PDCCH in the control section of each subframe, i.e., the first symbol period of each subframe, the LTE-A may also transmit these control-oriented channels in the data portions of each subframe as well. As shown in FIG. 2, these new control designs utilizing the data region, e.g., the Relay-Physical Downlink Control Channel (R-PDCCH) and Relay-Physical HARQ Indicator Channel (R-PHICH) are included in the later symbol periods of each subframe. The R-PDCCH is a new type of control channel utilizing the data region originally developed in the context of half-duplex relay operation. Different from legacy PDCCH and PHICH, which occupy the first several control symbols in one subframe, R-PDCCH and R-PHICH are mapped to resource elements (REs) originally designated as the data region. The new control channel may be in the form of Frequency Division Multiplexing (FDM), Time Division Multiplexing (TDM), or a combination of FDM and TDM.

The eNB may send the PSS, SSS and PBCH in the center 1.08 MHz of the system bandwidth used by the eNB. The eNB may send the PCFICH and PHICH across the entire system bandwidth in each symbol period in which these channels are sent. The eNB may send the PDCCH to groups of UEs in certain portions of the system bandwidth. The eNB may send the PDSCH to specific UEs in specific portions of the system bandwidth. The eNB may send the PSS, SSS, PBCH, PCFICH and PHICH in a broadcast manner to all UEs, may send the PDCCH in a unicast manner to specific UEs, and may also send the PDSCH in a unicast manner to specific UEs.

A number of resource elements may be available in each symbol period. Each resource element may cover one subcarrier in one symbol period and may be used to send one modulation symbol, which may be a real or complex value. Resource elements not used for a reference signal in each symbol period may be arranged into resource element groups (REGs). Each REG may include four resource elements in one symbol period. The PCFICH may occupy four REGs, which may be spaced approximately equally across frequency, in symbol period 0. The PHICH may occupy three REGs, which may be spread across frequency, in one or more configurable symbol periods. For example, the three REGs for the PHICH may all belong in symbol period 0 or may be spread in symbol periods 0, 1 and 2. The PDCCH may occupy 9, 18, 32 or 64 REGs, which may be selected from the available REGs, in the first M symbol periods. Only certain combinations of REGs may be allowed for the PDCCH.

A UE may know the specific REGs used for the PHICH and the PCFICH. The UE may search different combinations of REGs for the PDCCH. The number of combinations to search is typically less than the number of allowed combinations for the PDCCH. An eNB may send the PDCCH to the UE in any of the combinations that the UE will search.

A UE may be within the coverage of multiple eNBs. One of these eNBs may be selected to serve the UE. The serving eNB may be selected based on various criteria such as received power, path loss, signal-to-noise ratio (SNR), etc.

Figure 3:
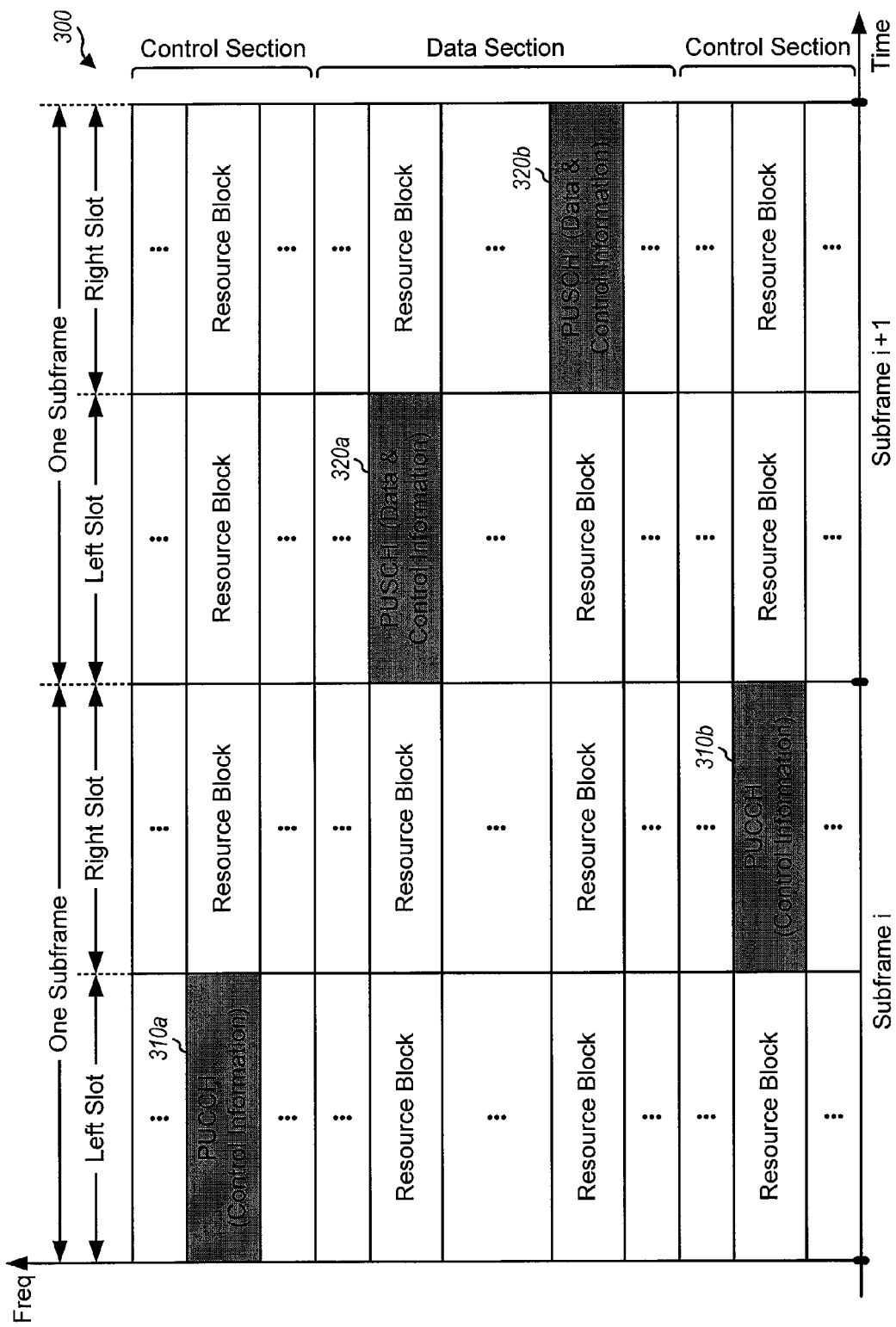
FIG. 3 is a block diagram conceptually illustrating an exemplary frame structure in uplink LTE/-A communications.

FIG. 3 is a block diagram conceptually illustrating an exemplary frame structure 300 in uplink long term evolution (LTE/-A) communications. The available resource blocks (RBs) for the uplink may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The design in FIG. 3 results in the data section including contiguous subcarriers, which may allow a single UE to be assigned all of the contiguous subcarriers in the data section.

A UE may be assigned resource blocks in the control section to transmit control information to an eNB. The UE may also be assigned resource blocks in the data section to transmit data to the eNode B. The UE may transmit control information in a Physical Uplink Control Channel (PUCCH) on the assigned resource blocks 310*a* and 310*b* in the control section. The UE may transmit only data or both data and control information in a Physical Uplink Shared Channel (PUSCH) on the assigned resource blocks 320*a* and 320*b* in the data section. An uplink transmission may span both slots of a subframe and may hop across frequency as shown in FIG. 3.

Referring back to FIG. 1, the wireless network 100 uses the diverse set of eNBs 110 (i.e., macro eNBs, pico eNBs, femto eNBs, and relays) to improve the spectral efficiency of the system per unit area. Because the wireless network 100 uses such different eNBs for its spectral coverage, it may also be referred to as a heterogeneous network. The macro eNBs 110*a-c* are usually carefully planned and placed by the provider of the wireless network 100. The macro eNBs 110*a-c* generally transmit at high power levels (e.g., 5 W-40 W). The pico eNB 110*x* and the relay station 110*r*, which generally transmit at substantially lower power levels (e.g., 100 mW-2 W), may be deployed in a relatively unplanned manner to eliminate coverage holes in the coverage area provided by the macro eNBs 110*a-c* and improve capacity in the hot spots. The femto eNBs 110*y-z*, which are typically deployed independently from the wireless network 100 may, nonetheless, be incorporated into the coverage area of the wireless network 100 either as a potential access point to the wireless network 100, if authorized by their administrator(s), or at least as an active and aware eNB that may communicate with the other eNBs 110 of the wireless network 100 to perform resource coordination and coordination of interference management. The femto eNBs 110*y-z* typically also transmit at substantially lower power levels (e.g., 100 mW-2 W) than the macro eNBs 110*a-c*.

In operation of a heterogeneous network, such as the wireless network 100, each UE is usually served by the eNB 110 with the better signal quality, while the unwanted signals received from the other eNBs 110 are treated as interference. While such operational principals can lead to significantly sub-optimal performance, gains in network performance are realized in the wireless network 100 by using intelligent resource coordination among the eNBs 110, better server selection strategies, and more advanced techniques for efficient interference management.

A pico eNB, such as the pico eNB 110*x*, is characterized by a substantially lower transmit power when compared with a macro eNB, such as the macro eNBs 110*a-c*. A pico eNB will also usually be placed around a network, such as the wireless network 100, in an ad hoc manner. Because of this unplanned deployment, wireless networks with pico eNB placements, such as the wireless network 100, can be expected to have large areas with low signal to interference conditions, which can make for a more challenging RF environment for control channel transmissions to UEs on the edge of a coverage area or cell (a "cell-edge" UE). Moreover, the potentially large disparity (e.g., approximately 20 dB) between the transmit power levels of the macro eNBs 110*a-c* and the pico eNB 110*x* implies that, in a mixed deployment, the downlink coverage area of the pico eNB 110*x* will be much smaller than that of the macro eNBs 110*a-c*.

In the uplink case, however, the signal strength of the uplink signal is governed by the UE, and, thus, will be similar when received by any type of the eNBs 110. With the uplink coverage areas for the eNBs 110 being roughly the same or similar, uplink handoff boundaries will be determined based on channel gains. This can lead to a mismatch between downlink handover boundaries and uplink handover boundaries. Without additional network accommodations, the mismatch would make the server selection or the association of UE to eNB more difficult in the wireless network 100 than in a macro eNB-only homogeneous network, where the downlink and uplink handover boundaries are more closely matched.

If server selection is based predominantly on downlink received signal strength, the usefulness of mixed eNB deployment of heterogeneous networks, such as the wireless network 100, will be greatly diminished. This is because the larger coverage area of the higher powered macro eNBs, such as the macro eNBs 110*a-c*, limits the benefits of splitting the cell coverage with the pico eNBs, such as the pico eNB 110*x*, because, the higher downlink received signal strength of the macro eNBs 110*a-c* will attract all of the available UEs, while the pico eNB 110*x* may not be serving any UE because of its much weaker downlink transmission power. Moreover, the macro eNBs 110*a-c* will likely not have sufficient resources to efficiently serve those UEs. Therefore, the wireless network 100 will attempt to actively balance the load between the macro eNBs 110*a-c* and the pico eNB 110*x* by expanding the coverage area of the pico eNB 110*x*. This concept is referred to as cell range extension (CRE).

The wireless network 100 achieves CRE by changing the manner in which server selection is determined. Instead of basing server selection on downlink received signal strength, selection is based more on the quality of the downlink signal. In one such quality-based determination, server selection may be based on determining the eNB that offers the minimum path loss to the UE. Additionally, the wireless network 100 provides a fixed partitioning of resources between the macro eNBs 110*a-c* and the pico eNB 110*x*. However, even with this active balancing of load, downlink interference from the macro eNBs 110*a-c* should be mitigated for the UEs served by the pico eNBs, such as the pico eNB 110*x*. This can be accomplished by various methods, including interference cancellation at the UE, resource coordination among the eNBs 110, or the like.

Figure 4:
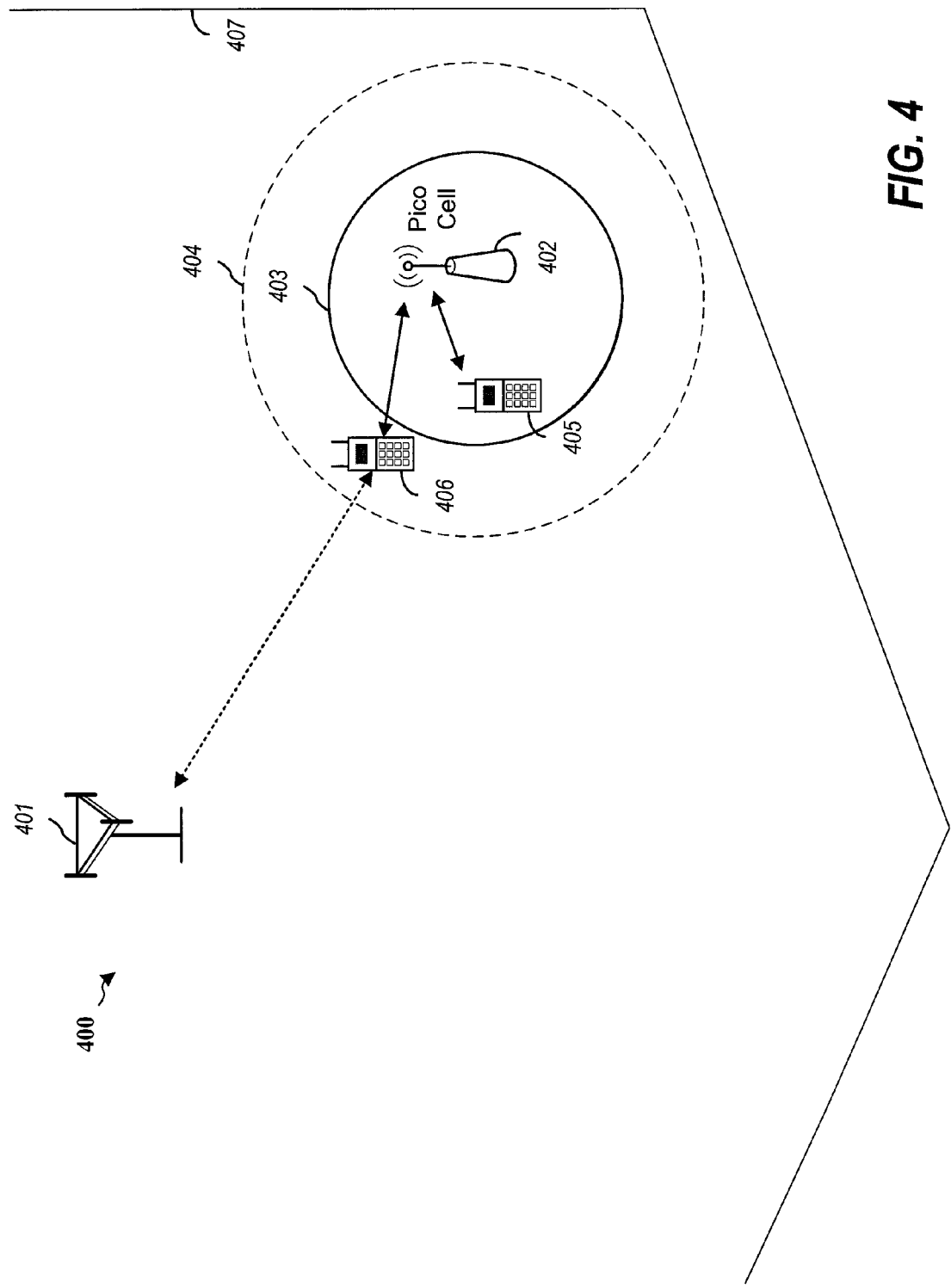
FIG. 4 is a block diagram conceptually illustrating a cell having a CRE region in a heterogeneous network.

FIG. 4 is a block diagram conceptually illustrating a cell 400 having a CRE region within a macro cell boundary 407 in a heterogeneous network. A lower power class eNB 402, such as a pico, femto, or RRH, which serves a UE 405 with a cellular region 403, may have a CRE region 404 that is expanded from the cellular region 403 through enhanced inter-cell interference coordination between the lower power class eNB 402 and the macro eNB 401 and through interference cancelation performed by the UE 406. In enhanced inter-cell interference coordination, the lower power class eNB 402 receives information from the macro eNB 401 regarding an interference condition of the UE 406. The information allows the lower power class eNB 402 to serve the UE 406 in the range expanded cellular region 404 and to accept a handoff of the UE 406 from the macro eNB 401 as the UE 406 enters the range expanded cellular region 404.

In a heterogeneous network with CRE, such as the wireless network 100, in order for UEs to obtain service from the lower-powered eNBs, such as the pico eNB 110*x*, in the presence of the stronger downlink signals transmitted from the higher-powered eNBs, such as the macro eNBs 110*a-c*, the pico eNB 110*x* engages in control channel and data channel interference coordination with the dominant interfering macro eNBs 110*a-c*. Many different techniques for interference coordination may be employed to manage interference. For example, inter-cell interference coordination (ICIC) may be used to reduce interference from cells in co-channel deployment. One ICIC mechanism is adaptive resource partitioning. Adaptive resource partitioning assigns subframes to certain eNBs. In subframes assigned to a first eNB, neighbor eNBs do not transmit. Thus, interference experienced by a UE served by the first eNB is reduced. Subframe assignment may be performed on both the uplink and downlink channels.

For example, subframes may be allocated between a combination of protected subframes (U subframes), prohibited subframes (N subframes), and may also include common subframes (C subframes). Protected subframes are assigned to a first eNB for use exclusively by the first eNB. Protected subframes may also be referred to as "clean" subframes based on reduced interference from neighboring eNBs. Prohibited subframes are subframes assigned to a neighbor eNB, and the first eNB is prohibited from transmitting data during the prohibited subframes. For example, a prohibited subframe of the first eNB may correspond to a protected subframe of a second interfering eNB. Thus, the first eNB will generally transmit data during the first eNB's protected subframe. Common subframes may be used for data transmission by multiple eNBs. Common subframes may also be referred to as "unclean" or "unprotected" subframes because of the possibility of interference from other eNBs.

At least one protected subframe is statically assigned per period. In some cases only one protected subframe is statically assigned. For example, if a period is 8 milliseconds, one protected subframe may be statically assigned to an eNB during every 8 milliseconds. Other subframes may be dynamically allocated.

Adaptive resource partitioning information (ARPI) allows the non-statically assigned subframes to be dynamically allocated. Any of protected, prohibited, or common subframes may be dynamically allocated (AU, AN, AC subframes, respectively). The dynamic assignments may change quickly, such as, for example, every one hundred milliseconds or less.

Heterogeneous networks may have eNBs of different power classes. For example, three power classes may be defined, in decreasing power class, as macro eNBs, pico eNBs, and femto eNBs. When macro eNBs, pico eNBs, and femto eNBs are in a co-channel deployment, the power spectral density (PSD) of the macro eNB (aggressor eNB) may be larger than the PSD of the pico eNB and the femto eNB (victim eNBs) creating large amounts of interference with the pico eNB and the femto eNB. Protected subframes may be used to reduce or minimize interference with the pico eNBs and femto eNBs. That is, a protected subframe may be scheduled for the victim eNB to correspond with a prohibited subframe on the aggressor eNB.

Figure 5:
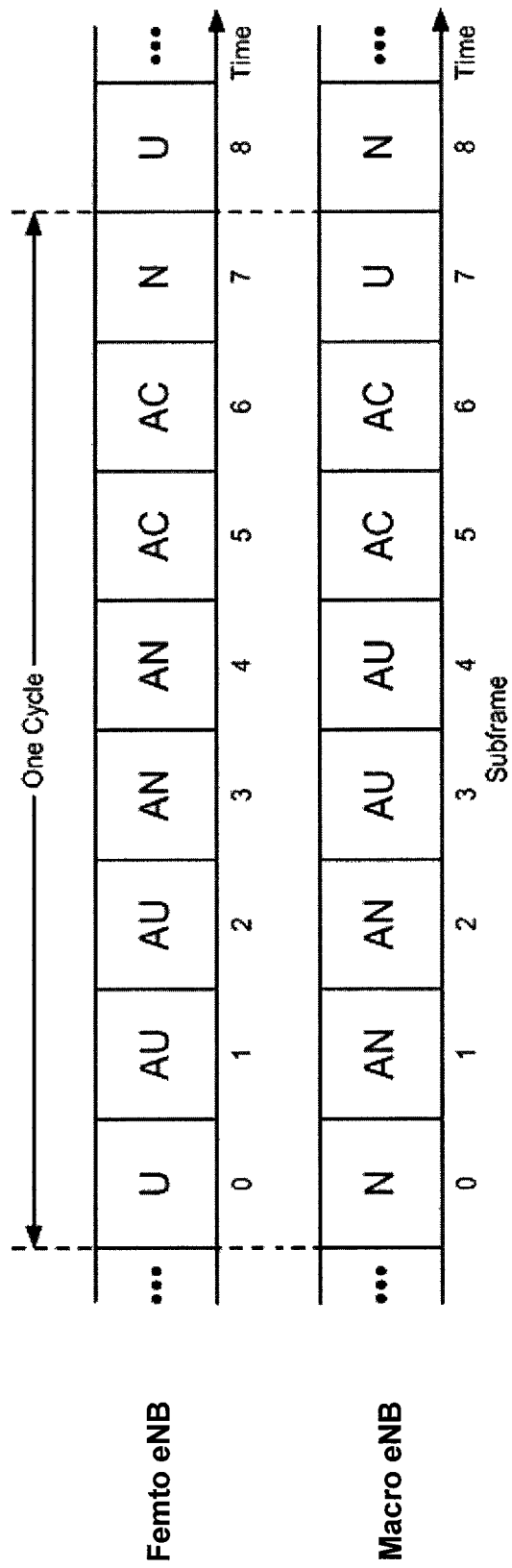
FIG. 5 is a block diagram conceptually illustrating time division multiplexed (TDM) partitioning in a heterogeneous network according to one aspect of the disclosure.

FIG. 5 is a block diagram illustrating time division multiplexed (TDM) partitioning in a heterogeneous network according to one aspect of the disclosure. A first row of blocks illustrate subframe assignments for a femto eNB, and a second row of blocks illustrate subframe assignments for a macro eNB. Each of the eNBs has a static protected subframe during which the other eNB has a static prohibited subframe. For example, the femto eNB has a protected subframe (U subframe) in subframe 0 corresponding to a prohibited subframe (N subframe) in subframe 0. Likewise, the macro eNB has a protected subframe (U subframe) in subframe 7 corresponding to a prohibited subframe (N subframe) in subframe 7. Subframes 1-6 are dynamically assigned as either protected subframes (AU), prohibited subframes (AN), and common subframes (AC). During the dynamically assigned common subframes (AC) in subframes 5 and 6, both the femto eNB and the macro eNB may transmit data.

Protected subframes (such as U/AU subframes) have reduced interference and a high channel quality because aggressor eNBs are prohibited from transmitting. Prohibited subframes (such as N/AN subframes) have no data transmission to allow victim eNBs to transmit data with low interference levels. Common subframes (such as C/AC subframes) have a channel quality dependent on the number of neighbor eNBs transmitting data. For example, if neighbor eNBs are transmitting data on the common subframes, the channel quality of the common subframes may be lower than the protected subframes. Channel quality on common subframes may also be lower for CRE UEs strongly affected by aggressor eNBs. A CRE UE may belong to a first eNB but also be located in the coverage area of a second eNB. For example, a UE communicating with a macro eNB that is near the range limit of a femto eNB coverage is a CRE UE.

Another example interference management scheme that may be employed in LTE/-A is the slowly-adaptive interference management. Using this approach to interference management, resources are negotiated and allocated over time scales that are much larger than the scheduling intervals. The goal of the scheme is to find a combination of transmit powers for all of the transmitting eNBs and UEs over all of the time or frequency resources that maximizes the total utility of the network. "Utility" may be defined as a function of user data rates, delays of quality of service (QoS) flows, and fairness metrics. Such an algorithm can be computed by a central entity that has access to all of the information used for solving the optimization and has control over all of the transmitting entities, such as, for example, the network controller 130 (FIG. 1). This central entity may not always be practical or even desirable. Therefore, in alternative aspects a distributed algorithm may be used that makes resource usage decisions based on the channel information from a certain set of nodes. Thus, the slowly-adaptive interference algorithm may be deployed either using a central entity or by distributing the algorithm over various sets of nodes/entities in the network.

In deployments of heterogeneous networks, such as the wireless network 100, a UE may operate in a dominant interference scenario in which the UE may observe high interference from one or more interfering eNBs. A dominant interference scenario may occur due to restricted association. For example, in FIG. 1, the UE 120y may be close to the femto eNB 110y and may have high received power for the eNB 110y. However, the UE 120y may not be able to access the femto eNB 110y due to restricted association and may then connect to the macro eNB 110c (as shown in FIG. 1) or to the femto eNB 110z also with lower received power (not shown in FIG. 1). The UE 120y may then observe high interference from the femto eNB 110y on the downlink and may also cause high interference to the eNB 110y on the, uplink. Using coordinated interference management, the eNB 110c and the femto eNB 110y may communicate over the backhaul 134 to negotiate resources. In the negotiation, the femto eNB 110y agrees to cease transmission on one of its channel resources, such that the UE 120y will not experience as much interference from the femto eNB 110y as it communicates with the eNB 110c over that same channel.

In addition to the discrepancies in signal power observed at the UEs in such a dominant interference scenario, timing delays of downlink signals may also be observed by the UEs, even in synchronous systems, because of the differing distances between the UEs and the multiple eNBs. The eNBs in a synchronous system are presumptively synchronized across the system. However, for example, considering a UE that is a distance of 5 km from the macro eNB, the propagation delay of any downlink signals received from that macro eNB would be delayed approximately 16.67 μs (5 km÷$3\times10^8$, i.e., the speed of light, 'c'). Comparing that downlink signal from the macro eNB to the downlink signal from a much closer femto eNB, the timing difference could approach the level of a time-to-live (TTL) error.

Additionally, such timing difference may impact the interference cancellation at the UE. Interference cancellation often uses cross correlation properties between a combination of multiple versions of the same signal. By combining multiple copies of the same signal, interference may be more easily identified because, while there will likely be interference on each copy of the signal, it will likely not be in the same location. Using the cross correlation of the combined signals, the actual signal portion may be determined and distinguished from the interference, thus, allowing the interference to be canceled.

Figure 6:
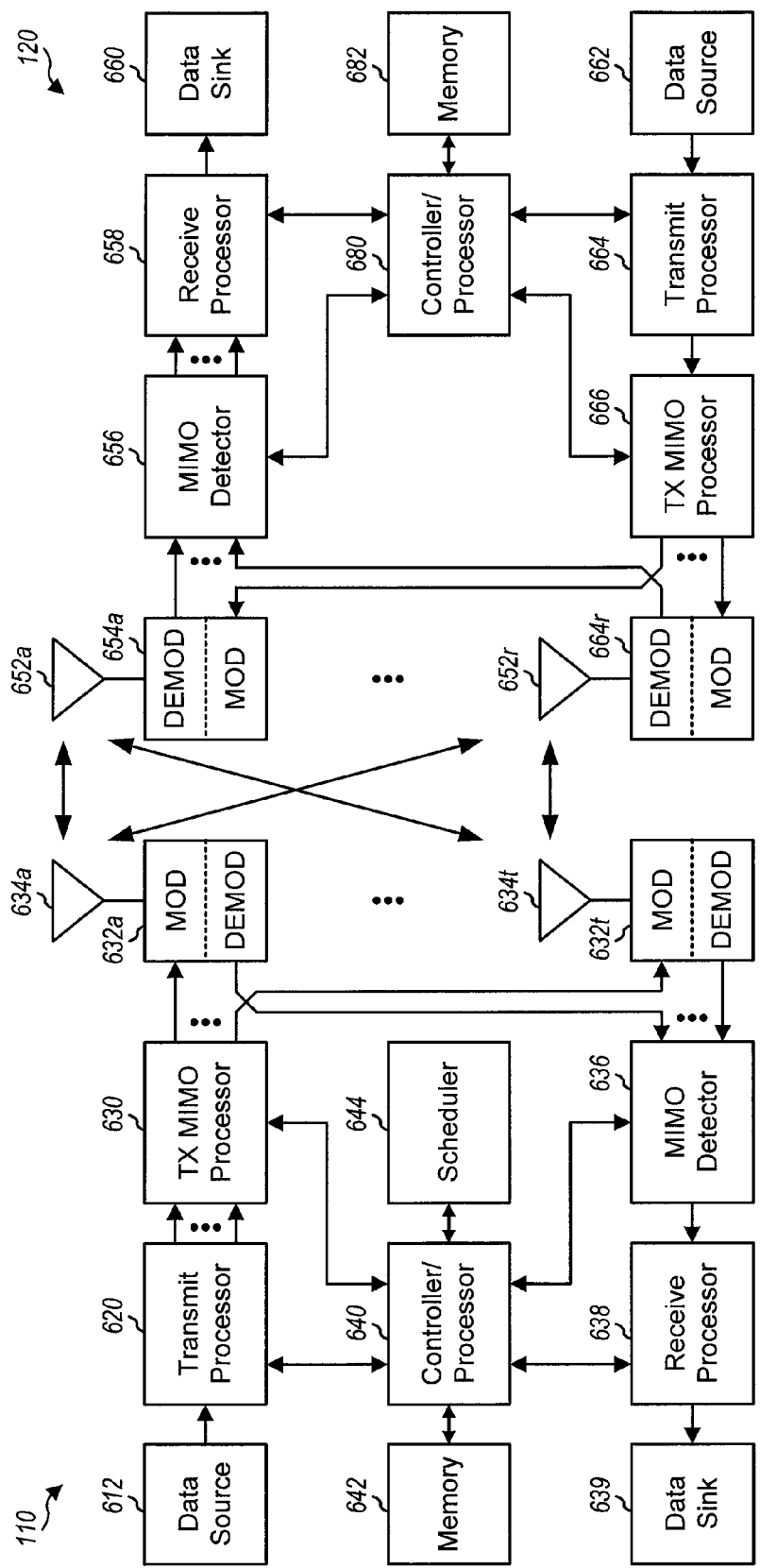
FIG. 6 is a block diagram conceptually illustrating a design of a base station/eNB and a UE configured according to one aspect of the present disclosure.

FIG. 6 shows a block diagram of a design of a base station/eNB 110 and a UE 120, which may be one of the base stations/eNBs and one of the UEs in FIG. 1. For a restricted association scenario, the eNB 110 may be the macro eNB 110c in FIG. 1, and the UE 120 may be the UE 120y. The eNB 110 may also be a base station of some other type. The eNB 110 may be equipped with antennas 634a through 634t, and the UE 120 may be equipped with antennas 652a through 652r.

At the eNB 110, a transmit processor 620 may receive data from a data source 612 and control information from a controller/processor 640. The control information may be for the PBCH, PCFICH, PHICH, PDCCH, etc. The data may be for the PDSCH, etc. The processor 620 may process (e.g., encode and symbol map) the data and control information to obtain data symbols and control symbols, respectively. The processor 620 may also generate reference symbols, e.g., for the PSS, SSS, and cell-specific reference signal. A transmit (TX) multiple-input multiple-output (MIMO) processor 630 may perform spatial processing (e.g., precoding) on the data symbols, the control symbols, and/or the reference symbols, if applicable, and may provide output symbol streams to the modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. Downlink signals from modulators 632a through 632t may be transmitted via the antennas 634a through 634t, respectively.

At the UE 120, the antennas 652a through 652r may receive the downlink signals from the eNB 110 and may provide received signals to the demodulators (DEMODs) 654a through 654r, respectively. Each demodulator 654 may condition (e.g., filter, amplify, downconvert, and digitize) a respective received signal to obtain input samples. Each demodulator 654 may further process the input samples (e.g., for OFDM, etc.) to obtain received symbols. A MIMO detector 656 may obtain received symbols from all the demodulators 654a through 654r, perform MIMO detection on the received symbols if applicable, and provide detected symbols. A receive processor 658 may process (e.g., demodulate, deinterleave, and decode) the detected symbols, provide decoded data for the UE 120 to a data sink 660, and provide decoded control information to a controller/processor 680.

On the uplink, at the UE 120, a transmit processor 664 may receive and process data (e.g., for the PUSCH) from a data source 662 and control information (e.g., for the PUCCH) from the controller/processor 680. The processor 664 may also generate reference symbols for a reference signal. The symbols from the transmit processor 664 may be precoded by a TX MIMO processor 666 if applicable, further processed by the demodulators 654a through 654r (e.g., for SC-FDM, etc.), and transmitted to the eNB 110. At the eNB 110, the uplink signals from the UE 120 may be received by the antennas 634, processed by the modulators 632, detected by a MIMO detector 636 if applicable, and further processed by a receive processor 638 to obtain decoded data and control information sent by the UE 120. The processor 638 may provide the decoded data to a data sink 639 and the decoded control information to the controller/processor 640.

The controllers/processors 640 and 680 may direct the operation at the eNB 110 and the UE 120, respectively. The processor 640 and/or other processors and modules at the eNB 110 may perform or direct the execution of various processes for the techniques described herein. The processor 680 and/or other processors and modules at the UE 120 may also perform or direct the execution of the functional blocks illustrated in FIGS. 9, 10A, and 10B, and/or other processes for the techniques described herein. The memories 642 and 682 may store data and program codes for the eNB 110 and the UE 120, respectively. A scheduler 644 may schedule UEs for data transmission on the downlink and/or uplink.

Figure 7:
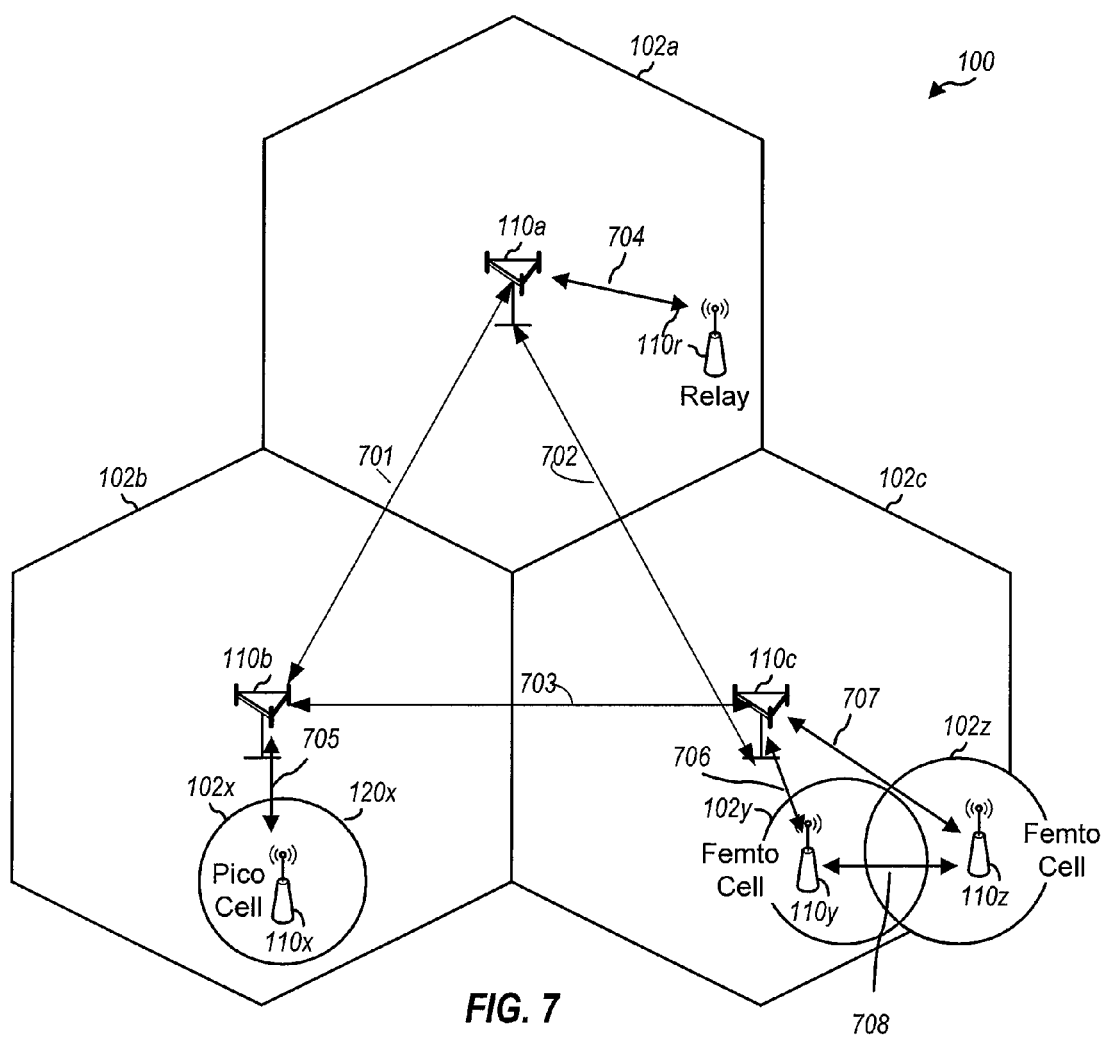
FIG. 7 is a block diagram conceptually illustrating an example of eNB inter-communication in a mobile communication system.

Inter-Cell Interference Coordination (ICIC) refers generally to techniques for the reduction of interference between cells, relying on exchange of information (for example on transmission resource scheduling) between different cells. ICIC techniques typically involve constraints on transmission resource allocations and/or power levels. In LTE, ICIC may be static or semi-static, with different levels of associated communication required between eNBs.

eNBs may communicate with each other via an inter-eNB interface. For instance, X2 refers to the interface used to interconnect eNBs in LTE. As shown in the example of FIG. 7, eNBs 110 of system 100 (of FIG. 1) may exchange messages with each other (e.g., via X2, fiber, or wireless interfaces). For instance, macro eNBs 110a, 110b, and 110c may exchange messages via a eNB inter-communication interfaces (e.g., X2, fiber, or wireless interfaces) 701, 702, and 703. Relay eNB 110r may exchange messages with macro eNB 110a (and/or other eNBs) via eNB inter-communication interface(s) (e.g., X2, fiber, or wireless interfaces), such as interface 704. Pico eNB 110x may exchange messages with macro eNB 110b (and/or other eNBs) via eNB inter-communication interface(s) (e.g., X2, fiber, or wireless interfaces), such as interface 705. Femto eNBs 110y and 110z may exchange messages with macro eNB 110c (and/or other eNBs) via eNB inter-communication interface(s) (e.g., X2, fiber, or wireless interfaces), such as interfaces 706 and 707. Further, femto eNBs 110y and 110z may exchange messages with each other via an eNB inter-communication interface (e.g., X2, fiber, or wireless interfaces) 708.

Alternatively, eNBs may communicate with each other via a backhaul network (e.g., the evolved packet core network) using backhaul signaling. For instance, the eNB may communicate through the backhaul network via an Si interface used to communicate to the core network. While the present application describes an implementation that employs X2 signaling between eNBs, the present implementation is not limited thereto and only requires communication to coordinate between eNBs, and is not limited to a particular communication implementation.

As discussed hereafter, various messages containing ICIC-related information may be exchanged between eNBs, such as messages containing a High Interface Indicator (HII), Overload Indicator (OI), and/or Relative Narrowband Transmit Power (RNTP) indicator, as examples. The HII and OI messages may be used for uplink interference coordination, and the RNTP messages may be used for downlink interference coordination.

However, conventionally many messages communicated between the eNBs, such as the above-mentioned HII, OI, and RNTP messages are not time-related (or tied to any particular time), but are instead tied to frequency resources. Thus, while time-domain partitioning of resources may be implemented (such as the TDM partitioning discussed above with FIG. 5), the ICIC-related messages communicated between eNBs (such as HIT, OI, and RNTP) are defined as tied to frequency without any relationship or correlation to the corresponding timing (e.g., subframes) to which they pertain. For instance, the HII, OI, and RNTP information pertains (or relates) to a particular frequency (e.g., a particular frequency subband), without indicating or taking into account timing information, such as to which subframe the information may pertain in a time-domain partitioning of resources.

A High Interference Indicator (HII) may be sent on the X2 interface between eNBs to indicate which resource blocks will be used for cell-edge UEs. The HII is an active message that does not depend on a measurement, but it allows an eNB to indicate that certain frequency sub-bands of resources are going to transmit at high power and others are going to have lower power.

An Overload Indicator (OI) may be sent on the X2 interface between eNBs to indicate physical layer measurements of the average uplink interference plus thermal noise for each Resource Block (RB). The OI can take three values, expressing low, medium, and high levels. The OI is a message that one eNB may send to its neighbor eNBs to indicate which resources for which it is observing high interference and which resources for which it is observing low interference. The neighbor eNB(s) may choose to either ignore the OI message or employ some algorithm for ICIC on the basis of the received OI message.

Relative Narrowband Transmit Power (RNTP) indicates, per Physical Resource Block (PRB), whether or not the cell intends to keep the downlink transmit power in the PRB below a certain threshold. The value of this threshold, and the period for which the RNTP indicator is valid in the future, are configurable. This enables the neighboring eNBs to take into account the expected level of interference in each RB when scheduling UEs in their own cells. The RNTP allows one eNB to communicate to a neighbor eNB that a downlink is going to transmit, and the relative transmit is higher on certain frequency resources than on others. As an example, if a given eNB informs a neighbor eNB that it is going to transmit at higher power on certain resources, then the neighbor eNB can account for this. For instance, the eNB can realize that certain resources are more protected than others.

Thus, by exchanging the above-mentioned messages, the eNBs can coordinate their traffic power levels and/or perform certain ICIC actions where desired. Depending on the vendor-specific (e.g., proprietary) implementation of a given eNB, the eNB may be implemented to make use of one or more of the above-mentioned ICIC-related inter-eNB messages (e.g., OI, HII, and RNTP) for performing ICIC actions. Of course, the above-mentioned ICIC-related inter-eNB messages are not commands and do not require a responsive action by an eNB. Furthermore, other commands, signals, or signaling paradigms may fall within the scope of various aspects of the invention.

As discussed above with FIG. 5, a time-domain partitioning of resources, such as TDM resource partitioning, may be employed for a multi-cell (e.g., heterogeneous) network. Further, in such time-domain partitioning of resources, the notion of protected resources (e.g., protected subframes) may be introduced, such as also discussed above with FIG. 5.

As discussed above, ICIC-related messages (e.g., OI, HII, and RNTP) are frequency based. For instance, as mentioned above, the OI, HII, and RNTP information is conventionally defined as pertaining to particular frequency(ies), such as to particular frequency subbands. Conventionally, any eNB implementation (e.g., algorithm) for managing ICIC actions based on the ICIC-related messages ignores any time domain and assumes that all subframes in time are treated equally. In other words, in managing the ICIC-related messages (which are frequency based), there is no distinction drawn between the treatment of subframes on the basis of time, but instead all resources are treated the same, whether frequency based or time based. Thus, conventional ICIC management employed by eNBs relies upon frequency-based information for the resources, and fails to account for or take into consideration timing information for the resources in managing ICIC.

With the introduction of time-domain partitioning of resources (such as the TDM partitioning discussed above with FIG. 5), an opportunity arises for the ICIC-related messages between eNBs (e.g., the above-mentioned X2 messages of OI, HII, and/or RNTP) to be re-interpreted somewhat for optimal ICIC management. In accordance with certain aspects of the present disclosure, various eNB actions in preparation of and/or in response to receipt of X2-based ICIC-related messages are disclosed. For instance, certain aspects of the present disclosure address the applicability of defined X2 messages for ICIC management in a network that employs time-domain (e.g., TDM) resource partitioning, as discussed further below.

When employing resource partitioning, such as the above-mentioned time-domain resource partitioning (e.g., TDM partitioning of FIG. 5), the management of these inter-eNB messages may differ from the management proposed by the LTE standards. Thus, certain aspects of the present disclosure propose an enhanced management of the inter-eNB messages for a network employing resource partitioning, such as the above-mentioned time-domain resource partitioning (e.g., TDM partitioning). That is, certain aspects of the present disclosure propose enhanced techniques for controlling the triggering of the inter-eNB messages (e.g., the triggering of sending OI messages) by an eNB and/or enhanced management of actions to be taken by an eNB responsive to receipt of such inter-eNB messages (e.g., receipt of OI, HII, or RNTP messages).

In accordance with certain aspects of the present disclosure, timing information pertaining to the time-domain resource partitioning is determined and taken into account by eNBs in interpreting or otherwise using the frequency-based inter-eNB messages. For instance, eNBs may determine whether particular frequency-based ICIC-related messages pertain to (or impact) a particular subframe of time-domain partitioned resources. By determining which subframes the frequency-based ICIC-related messages pertain to (or potentially impact), the eNBs can intelligently adapt their ICIC management for improved efficiency/performance. For instance, by determining which subframes the frequency-based ICIC-related messages pertain to (or potentially impact), the eNBs can better determine when to trigger the sending of a frequency-based ICIC-related message (e.g., when to send an OI message to neighboring eNBs) and/or the eNBs can better determine actions to take in response to receipt of frequency-based ICIC-related message(s) (e.g., responsive to receipt of OI, HII, and/or RNTP messages).

Thus, in one aspect of the present disclosure, the frequency-based ICIC-related information (e.g., the OI, HII, and/or RNTP messages) are correlated to the time-domain resource partitioning (e.g., TDM partitioning). Accordingly, time-domain partitioning information may be utilized to optimize performance. For instance, if an eNB receives an indication that a neighbor eNB is observing high interference, then the eNB can infer that the received message indicating high interference does not apply to its own protected subframes. That is, the eNB can associate the high interference message with certain types (e.g., unprotected) subframes even though the message itself does not contain any timing-related (e.g., TDM) information (but is instead just frequency based). Because of the time-domain resource partitioning, the eNB may determine the resources (e.g., which sub-frames) that correspond to the received inter-eNB ICIC-related messages.

Thus, in certain aspects of the present disclosure, the eNBs determine whether to send frequency-based messages to neighboring eNB(s) and/or to respond to such frequency-based message based on the active time-domain partitioning being employed in the network. For instance, by correlating the relationship of the frequency-based interference messages to the time-domain partitioning, the eNB can determine which subframes the interference messages potentially relate and/or which ICIC actions the eNB should take. The enhanced management techniques proposed herein, which account for the time-domain partitioning of resources in the management of ICIC-related messages, may be employed in addition to or in place of other ICIC management techniques that eNBs may choose to employ on the basis of the inter-eNB messages.

Exemplary enhanced ICIC management techniques that may be employed, in accordance with certain aspects of the present disclosure, on the basis of correlating the frequency-based ICIC-related messages with time-domain resource partitioning for managing ICIC (e.g., for determining when to trigger sending of message by an eNB and/or for determining actions for an eNB to take upon receiving a message) are described further below.

TDM resource partitioning defines certain mechanisms to enable inter-cell interference coordination (ICIC) in networks having multiple cells (e.g., macro, pico, and/or femto cells). Radio Resource Management (RRM) refers to the system-level control mechanisms used to manage radio resources in the air interface. The objective of RRM is to maximize the system spectral efficiency and to support mobility for the users. RRM therefore involves strategies and algorithms for resource allocation, Modulation and Coding Scheme (MCS), transmission power selection, and mobility.

An eNB responds to ICIC messages regardless of their applicability to the subframe under consideration. With TDM partitioning, however, some subframes may not be necessarily constrained by ICIC indication over X2.

Thus, in accordance with certain aspects of the present disclosure, eNB can employ the interference-messages for the purpose of ICIC whenever TDM partitioning exists between cells: OI and HII for uplink interference coordination, and RNTP for downlink interference coordination.

The OI indicator is currently defined as an X2 message to indicate high interference to neighboring cells, on a per-subband basis. It is a reactive indication triggered by filtered Interference over Thermal (IoT) measurements in the cell. While this measurement may relate to certain frequencies (e.g., on a per frequency subband basis), the OI indicator does not contain timing information (and so it does not indicate a particular sub-frame in a TDM partitioning of resources).

Accounting for TDM scheduling may allow for improved ICIC. For example, since under TDM partitioning some subframes may not allocated to the cell, the current X2 OI message may not be applicable or relevant. That is, in subframes where a cell is not scheduling uplink (UL) transmissions, neighbor cells do not need to follow its OI.

Before the OI message is sent, several options may be employed on an eNB for IoT measurements for generating OI messages. In general, techniques may be employed to effectively limit IoT measurements to uplink subframes that are allocated to the eNB.

Figure 8A:
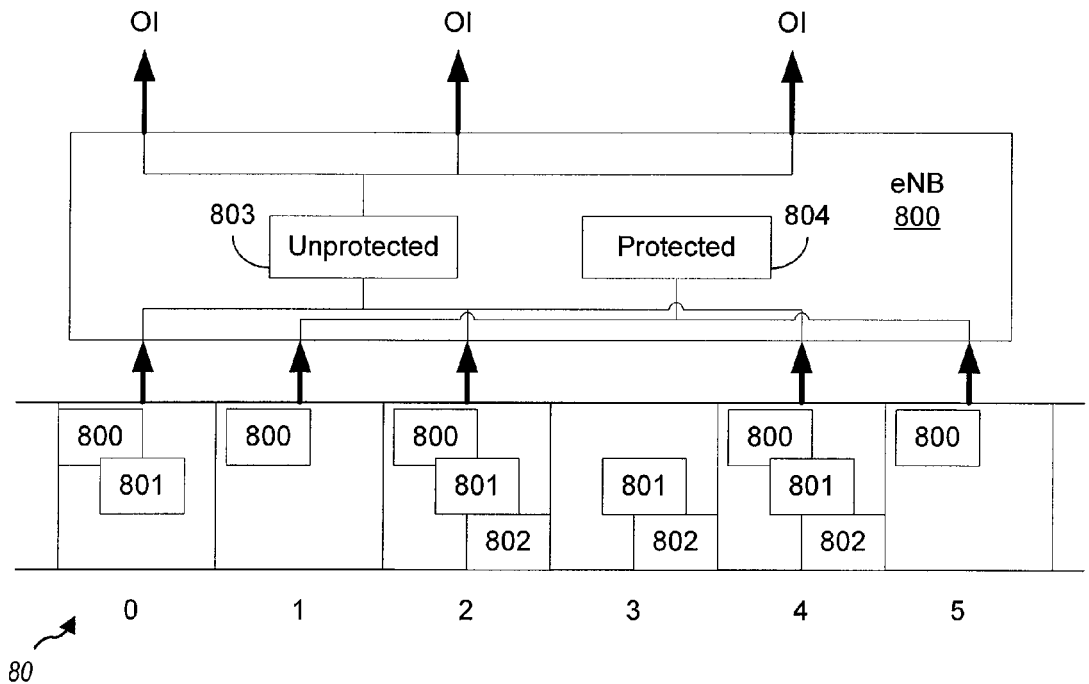
FIGS. 8A-8C are block diagrams conceptually illustrating an eNB configured according to multiple aspects of the present disclosure.

FIG. 8A is a block diagram conceptually illustrating an eNB 800 configured according to one aspect of the present disclosure. Subframe configuration 80 illustrates six subframes, numbered from 0 to 5. Within each subframe, a square indicates that a particular eNB transmits within the subframe. For example, in subframe 0, eNBs 800 and 801 transmit. Subframe 1 is a protected subframe for eNB 800, thus, only eNB 800 transmits in subframe 1. Similarly, in subframe 2, all of eNBs 800-802 transmit, and so on. When measuring IoT, one option, as illustrated in FIG. 8A, is for eNB 800 to perform separate measurements for each subframe of transmission stream 80, according to the level of protection (protected (U/AU), unprotected (AC)). eNB 800 takes IoT measurements of unprotected subframes 0, 2, and 4, averages those measurements, and stores the average in unprotected memory 803. Similarly, eNB 800 measures the IoT of protected subframes 1 and 5, averages those measurements, and stores the average in protected memory 804. If, in subframe 0, the unprotected average exceeds a threshold, eNB 800 will transmit the OI message. eNB 800 does not send an OI in protected subframes 1 and 5 as there should not be interference in those protected subframes. eNB 800 also does not send an OI in subframe 3, nor does eNB 800 take an IoT measurement in subframe 3. No IoT measurement or OI message is necessary for subframe 3 because eNB 800 is not transmitting therein. Accordingly, there is no need for the measurement to be included in the average nor is there a need to send an OI message.

Figure 8B:
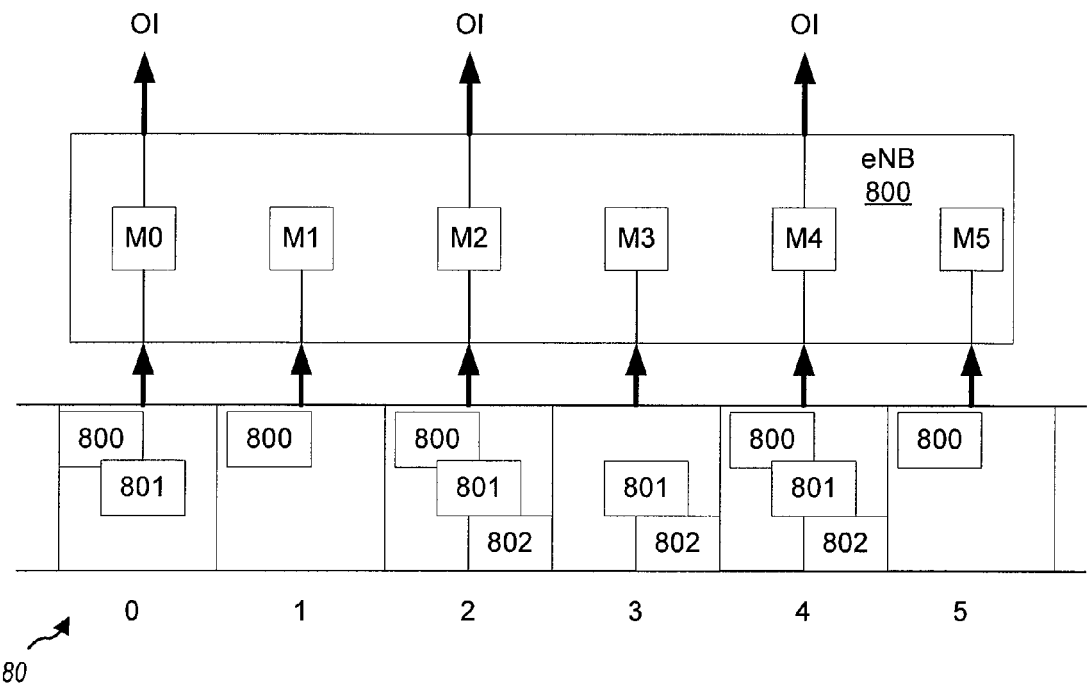

FIG. 8B is a block diagram conceptually illustrating an eNB 800 configured according to another aspect of the present disclosure. Another option, as illustrated in FIG. 8B, provides for eNB 800 to separately measure and store the IoT measurement for each subframe in the subframe configuration 80. As eNB 800 measures the IoT in each of subframes 0-5, the measured value is stored separately in memory M0-M5. When such IoT exceeds a threshold for the subframe, eNB 800 will transmit its OI message.

Figure 8C:
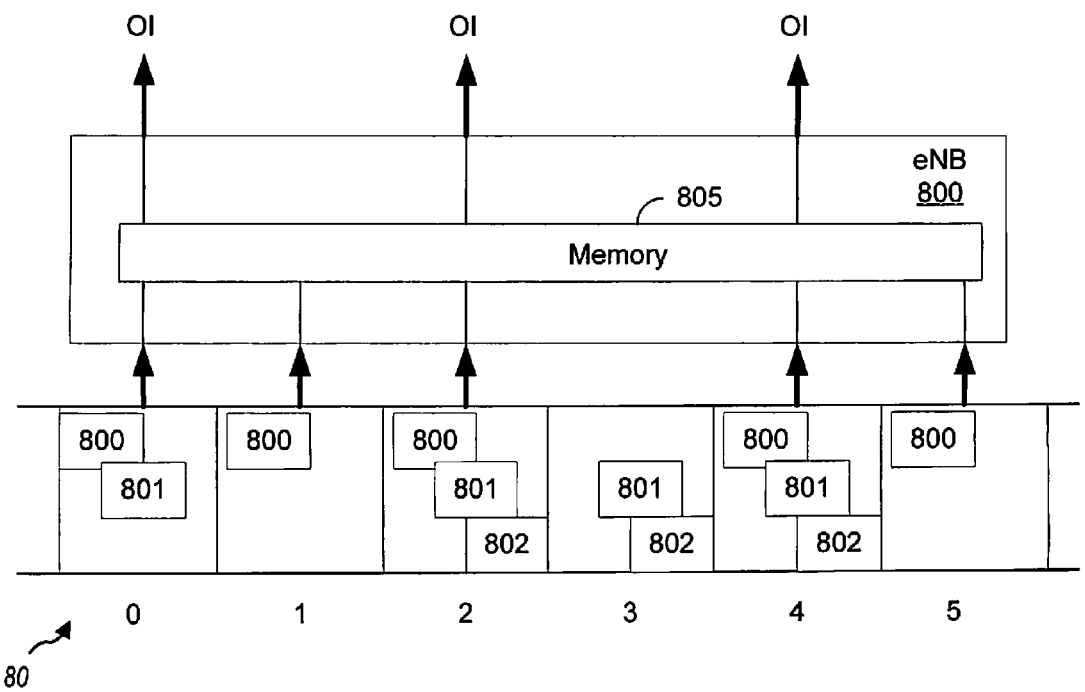

FIG. 8C is a block diagram conceptually illustrating an eNB 800 configured according to another aspect of the present disclosure. Another option, provides for single measurements may be performed over all usable subframes (U/AU/AC). As illustrated, eNB 800 takes IoT measurements of subframes 0-2, 4, and 5, averages the measurements and stores the average in memory 805. As illustrated in FIG. 8A, eNB 800 does not take IoT measurements of subframe 3, as it does not transmit in subframe 3. Without transmission, any interference in subframe 3 will not impact eNB 800.

Based on the IoT measurements, the eNB may determine whether to trigger the sending of an OI message to its neighboring eNB(s). Several options may be employed for OI message triggering by an eNB. As one option, the eNB may trigger OI based on measurements over all usable subframes (e.g., macro cell). As another option, the eNB may trigger OI based on unprotected AC (usable, but unprotected) subframes only (e.g., pico cell).

Upon receiving OI from a neighbor cell, an eNB may take any of several different actions. For instance, in one aspect of the present disclosure, on subframes not used by both cells (i.e., either the eNB sending the OI or the eNB receiving the OI is not using the subframe for transmission), the OI from the neighbor may be ignored by the receiving eNB for purpose of ICIC, and the OI received for subframes used by both cells (i.e., by both the eNB sending the OI and the eNB receiving the OI) may be taken into account by the receiving eNB for purpose of ICIC.

Upon receiving HII from a neighbor cell, an eNB may take any of several different actions. For instance, in one aspect of the present disclosure, an eNB receiving the HII from a neighbor eNB takes the HII into account only for the subframes in which both cells (i.e., both the eNB that sent the HII and the receiving eNB) are allowed to schedule transmissions, and the receiving eNB ignores HII in other subframes.

Upon receiving RNTP from a neighbor cell, an eNB may take any of several different actions. For instance, according to one aspect of the present disclosure, a TDM mode may be employed. In this mode, if any of the two cells (i.e., either the eNB sending the RNTP or the eNB receiving the RNTP) does not use the subframe on the downlink (DL), the RNTP is ignored, while on subframes used by both cells the RNTP is taken into account by the receiving eNB. According to another aspect of the present disclosure, a Hybrid TDM/FDM mode may be employed. In this mode, the RNTP is taken into account for every subframe for PDSCH, and protected TDM resources are used for reliable control channel signaling (PDCCH). For instance, if control is protected on scheduled subframe, PDCCH may be used, and if control is not protected, other mechanisms may be used, such as cross-subframe scheduling. Cross-subframe scheduling comprises sending control (e.g., PDCCH) information on a separate subframe from which the data transmission is scheduled.

Figure 9:
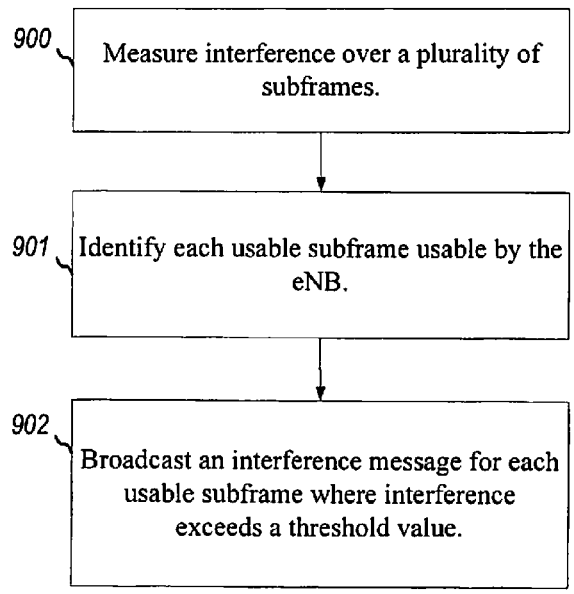
FIG. 9 is a functional block diagram conceptually illustrating example blocks executed to implement one aspect of the present disclosure.

Turning to FIG. 9, an exemplary functional block diagram according to one aspect of the present disclosure is shown. An eNB is deployed in a wireless communication network that comprises a plurality of cells with communication signals divided into subframes that are time-domain partitioned, such as in the exemplary TDM network discussed above with FIG. 5.

In block 900, the eNB measures interference over a plurality of subframes. For example, the eNB may perform separate IoT measurements for each of a plurality of different types of subframes having different levels of protection, such as protected and unprotected subframes. In this option, an average of each measurement, for the same type of subframe, is taken and saved as the interference measurement for that type of subframe. As another option, the eNB may perform separate IoT measurements for each subframe in a periodic resource pattern. As still another option, the eNB may perform an IoT measurement over all usable subframes of the eNB's cell. In this option, an average of the measurements over all usable subframes is taken and saved as the interference for each subframe.

In block 901, the eNB identifies each usable subframe of the plurality of subframes. A usable subframe in the case of time domain partitioning, including protected subframes (U/AU), but may also include common (AC) or shared subframes. Accordingly, in this step, the eNB may identify usable subframes which correlate with the IoT measurements for the various subframes.

The eNB broadcasts an interference message, in block 902, for each identified usable subframe when the interference associated with the identified usable subframe exceeds a threshold value. For instance, as discussed above, if the eNB measures the IoT and the IoT exceeds a threshold value, the eNB may broadcast an OI message to a neighboring eNB.

FIG. 10A is a functional block diagram configured according to one aspect of the present disclosure. As previously discussed, an eNB is deployed in a wireless communication network that comprises a plurality of cells with communication signals divided into subframes that are time-domain partitioned, such as in the exemplary TDM network discussed above with FIG. 4.

In block 1000, an eNB receives an interference message broadcast by a neighboring eNB. For example, the interference message may be an OI, HIT, RNTP, or the like.

The eNB determines a subframe type, in block 1001, of a plurality of subframes.

In operation, the eNBs will obtain the configuration of the subframes from the network or may find out the partitioning configuration through negotiating or cooperating with the neighboring eNBs.

In block 1002, ICIC actions are triggered in the eNB based on the interference message when the subframe type is determined to be unprotected. For example, when the subframe type is determined to be unprotected by a neighboring eNB, it will perform some kind of ICIC action based on receiving an uplink OI, or receiving an HII or RNTP.

FIG. 10B is a functional block diagram configured according to one aspect of the present disclosure. The functionality illustrated in FIG. 10B represents the alternative operation when the subframe type is determined to be protected.

Blocks 1000 and 1001 operate in the same manner as described in FIG. 10A. However, in block 1003, with a subframe determined to be a protected subframe, the eNB will ignore any uplink OI, HII, or RNTP that it receives for that subframe. As a protected subframe, there should be no other transmission on the subframe and, thus, no interference in the subframe attributable to neighboring eNBs.

Figure 11:
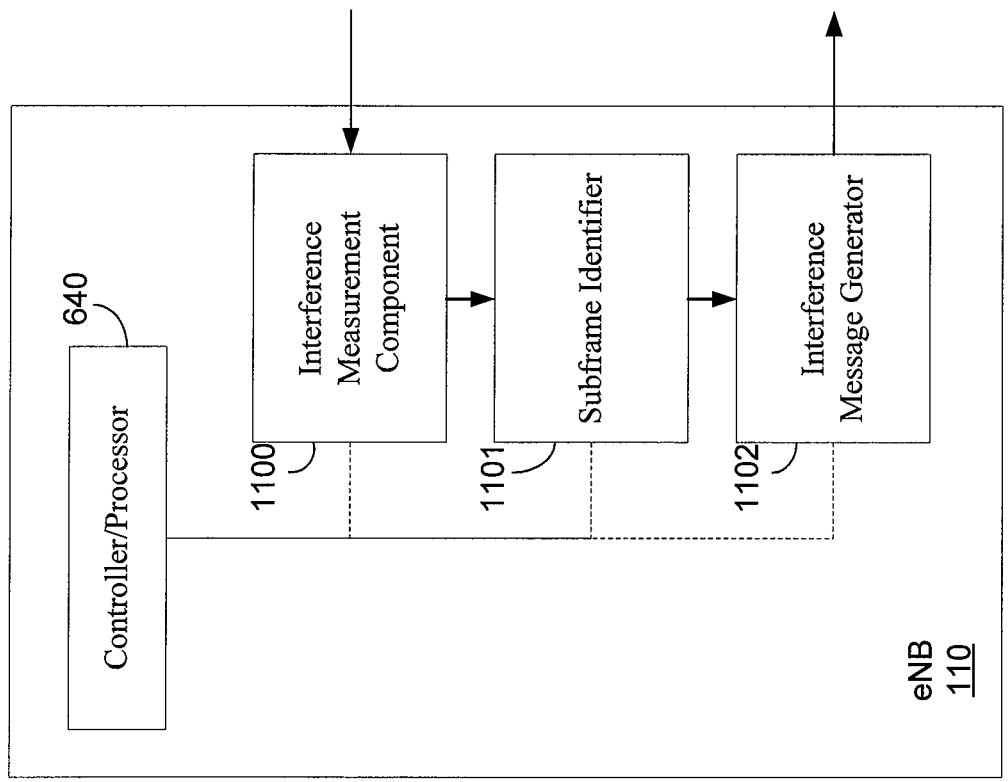
FIG. 11 is a block diagram conceptually illustrating an eNB configured according to one aspect of the present disclosure.

FIG. 11 is a block diagram conceptually illustrating an eNB 110 configured according to one aspect of the present disclosure. The eNB 110 includes a controller/processor 640 which executes various functions and components to operate, manage, and control the functionality of the eNB 110. The controller/processor 640 executes an interference measurement component 1100 which measures the interference on the various subframes in the cell in which eNB 110 operates. This provides the means for measuring interference over the various subframes. The controller/processor 640 also executes a subframe identifier 1101 which uses information in received signals and subframe assignments maintained in a memory (not shown) and accessible by controller/processor 640 to identify the types of subframes. This provides means for identifying each usable subframe of the various available subframes. The controller/processor 640 also executes an interference message generator 1102 which analyzes the amount of interference and, if the interference exceeds a threshold value, and the subframe identifier 1101 determines that a subframe is a usable subframe, generates an interference message for broadcast to neighboring eNBs. This provides means for broadcasting an interference message for each identified usable subframe when the interference associated with the identified usable subframe exceeds a threshold value.

Figure 12:
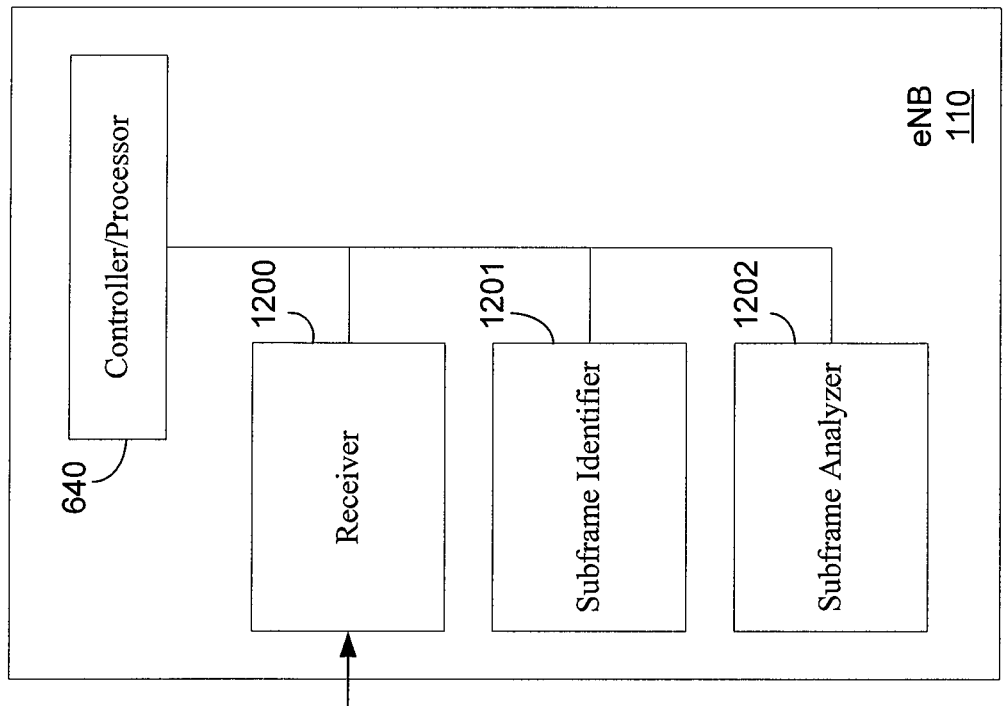
FIG. 12 is a block diagram conceptually illustrating an eNB configured according to another aspect of the present disclosure.

FIG. 12 is a block diagram conceptually illustrating an eNB 110 configured according to one aspect of the present disclosure. The eNB 110 includes a controller/processor 640 which executes various functions and components to operate, manage, and control the functionality of the eNB 110. A receiver 1200 provides means for receiving an interference message broadcast by a neighboring eNB. The controller/processor 640 executes a subframe identifier 1201 which uses information in received signals and subframe assignments maintained in a memory (not shown) and accessible by controller/processor 640 to identify the types of subframes. This provides a means for determining a subframe type of various available subframes. A subframe analyzer 1202, executed by controller/processor 640, analyzes the type of subframe when an interference message is received. This provides a means for triggering ICIC actions based on the interference message when the subframe type is determined to be unprotected.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 9, 10A, and 10B may comprise and/or be performed by processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both non-transitory computer storage media and communication media including any medium that facilitates transfer of a computer program from one place to another. A non-transitory storage media may be any available media that can be accessed by a general purpose or special purpose computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication by an evolved Node B (eNB) that transmits on a frequency band, comprising:
    measuring interference over a plurality of subframes including at least one protected subframes and at least one unprotected subframes, wherein the at least one protected subframes are assigned to the eNB for use by the eNB and restricted from use by a neighboring eNB that transmits on the frequency band used by the eNB;
    identifying at least one unprotected and usable subframe from said at least one unprotected subframes, said at least one unprotected and usable subframe being at least one subframe assigned to the eNB and the neighboring eNB for transmitting data, wherein the measuring includes:
    averaging interference measurements for the at least one protected subframes of the plurality of subframes; and
    averaging interference measurements for all unprotected and usable subframes of the plurality of subframes on which the eNB can one or more of: receive data and transmit data,
    wherein the measured interference associated with the identified unprotected and usable subframe comprises said average of the interference measurements for all unprotected and usable subframes of the plurality of subframes; and
    communicating an interference message pertaining to the frequency band when the measured interference associated with the identified at least one unprotected and usable subframe exceeds a threshold value.

2. The method of claim 1, wherein the measuring includes:
    maintaining a separate interference measurement for each of the plurality of subframes, wherein the interference associated with the identified unprotected and usable subframe comprises the separate interference measurement measured for the identified unprotected and usable subframe.

3. The method of claim 1, wherein the eNB comprises one of: a pico eNB and a femto eNB, and the interference message is broadcast for each identified unprotected and usable subframe.

4. The method of claim 1, wherein:
    the interference message comprises an overload indicator (OI); and
    the interference comprises interference-over-thermal (IoT).

5. The method of claim 1, further comprising:
    communicating a low interference message when the measured interference associated with the identified unprotected and usable subframe falls below the threshold value.

6. The method of claim 1, wherein the at least one protected subframes are assigned to the eNB for use by the eNB and restricted from use by at least one neighboring eNB in accordance with an interference coordination (IC) scheme.

7. The method of claim 6, wherein the IC scheme allocates the at least one protected subframes based on a negotiated subframe allocation between the eNB and the at least one neighboring eNB.

8. A method for wireless communication by an evolved Node B (eNB) that transmits on a frequency band, comprising:
    receiving an interference message broadcast by a neighboring eNB to indicate detection of interference by the eNB;
    determining a subframe type of each subframe of a plurality of time-domain subframes to be protected or unprotected, wherein a protected subframe is assigned to the eNB for use by the eNB and restricted from use by the neighboring eNB that transmits on the frequency band used by the eNB; and
    triggering inter-cell interference coordination (ICIC) actions that constrain channel resource allocations or power levels of data transmissions, based on the interference message in response to the subframe type being determined to be unprotected, wherein an unprotected subframe is assigned to the eNB and the neighboring eNB for transmitting data, and wherein the interference message is based on a measured interference including a first average of interference measurements for protected subframes of the plurality of time-domain subframes and a second average of interference measurements for unprotected and usable subframes of the plurality of time-domain subframes.

9. The method of claim 8, furthering comprising:
    ignoring the interference message in response to the subframe type being determined to be protected.

10. The method of claim 8, wherein the interference message comprises one of:
    an overload indicator (OI);
    a high interference indicator (HII); and
    a relative narrowband transmission power (RNTP) message.

11. The method of claim 10, wherein the interference message comprises the RNTP message, and further comprising:
    triggering ICIC actions based on the interference message in response to the subframe type being determined to be protected, wherein the ICIC actions are performed for at least one of: a data channel and a control channel.

12. The method of claim 8, further comprising:
    triggering ICIC actions based on the interference message for control channel signaling for one or more subframes determined to be protected.

13. An apparatus for wireless communication of an evolved Node B (eNB) that transmits on a frequency band, comprising:
    means for measuring interference over a plurality of subframes including at least one protected subframes and at least one unprotected subframes, wherein the at least one protected subframes are assigned to the eNB for use by the eNB and restricted from use by a neighboring eNB that transmits on the frequency band used by the eNB;
    means for identifying at least one unprotected and usable subframe from said at least one unprotected subframes, said at least one unprotected and usable subframe being at least one subframe assigned to the eNB and the neighboring eNB for transmitting data, wherein the means for measuring includes:
    means for averaging interference measurements for the at least one protected subframes of the plurality of subframes; and means for averaging interference measurements for all unprotected and usable subframes of the plurality of subframes on which the eNB can one or more of: receive data and transmit data, wherein the measured interference associated with the identified unprotected and usable subframe comprises said average of the interference measurements for all unprotected and usable subframes of the plurality of subframes; and means for communicating an interference message pertaining to the frequency band when the measured interference associated with the identified at least one unprotected and usable subframe exceeds a threshold value.

14. The apparatus of claim 13, wherein the means for measuring includes:

means for maintaining a separate interference measurement for each of the plurality of subframes, wherein the interference associated with the identified unprotected and usable subframe comprises the separate interference measurement measured for the identified unprotected and usable subframe.

15. The apparatus of claim 13, wherein the eNB comprises one of: a pico eNB and a femto eNB, and the interference message is broadcast for each identified unprotected and usable subframe.

16. The apparatus of claim 13, wherein:

the interference message comprises an overload indicator (OI); and the interference comprises interference-over-thermal (IoT).

17. The apparatus of claim 13, further comprising:

means for communicating a low interference message when the measured interference associated with the identified unprotected and usable subframe falls below the threshold value.

18. An apparatus for wireless communication of an evolved Node B (eNB) that transmits on a frequency band, comprising:

means for receiving an interference message broadcast by a neighboring eNB;

means for determining a subframe type of each subframe of a plurality of time-domain subframes to be protected or unprotected, wherein a protected subframe is assigned to the eNB for use by the eNB and restricted from use by the neighboring eNB that transmits on the frequency band used by the eNB; and means for triggering inter-cell interference coordination (ICIC) actions that constrain resource allocations or power levels of data transmissions, based on the interference message in response to the subframe type being determined to be unprotected, wherein an unprotected subframe is assigned to the eNB and the neighboring eNB for transmitting data, and wherein the interference message is based on a measured interference including a first average of interference measurements for protected subframes of the plurality of time-domain subframes and a second average of interference measurements for unprotected and usable subframes of the plurality of time-domain subframes.

19. The apparatus of claim 18, furthering comprising:

means for ignoring the interference message in response to the subframe type being determined to be protected.

20. The apparatus of claim 18, wherein the interference message comprises one of:

an overload indicator (OI);
a high interference indicator (HII); and
a relative narrowband transmission power (RNTP) message.

21. The apparatus of claim 18, wherein the interference message comprises the RNTP message, and further comprising:

means for triggering ICIC actions based on the interference message in response to the subframe type being determined to be protected, wherein the ICIC actions are performed for at least one of: a data channel and a control channel.

22. The apparatus of claim 20, further comprising:

means for triggering ICIC actions based on the interference message for control channel signaling for one or more subframes determined to be protected.

23. A computer program product for wireless communications in a wireless network by an evolved Node B (eNB) that transmits on a frequency band, comprising:

a non-transitory computer-readable medium having program code recorded thereon, the program code comprising:

program code to measure interference over a plurality of subframes including at least one protected subframes and at least one unprotected subframes, wherein the at least one protected subframes are assigned to the eNB for use by the eNB and restricted from use by a neighboring eNB that transmits on the frequency band used by the eNB;

program code to identify at least one unprotected and usable subframe from said at least one unprotected subframes, said at least one unprotected and usable subframe being at least one subframe assigned to the eNB and the neighboring eNB for transmitting data, wherein the program code to measure includes:

program code to average interference measurements for the at least one protected subframes of the plurality of subframes; and program code to average interference measurements for all unprotected and usable subframes of the plurality of subframes on which the eNB can one or more of: receive data and transmit data, wherein the measured interference associated with the identified unprotected and usable subframe comprises said average of the interference measurements for all unprotected and usable subframes of the plurality of subframes; and program code to communicate an interference message pertaining to the frequency band when the measured interference associated with the identified at least one unprotected and usable subframe exceeds a threshold value.

24. The computer program product of claim 23, wherein the program code to measure includes:

program code to maintain a separate interference measurement for each of the plurality of subframes, wherein the interference associated with the identified unprotected and usable subframe comprises the separate interference measurement measured for the identified unprotected and usable subframe.

25. The computer program product of claim 23, wherein the eNB comprises one of: a pico eNB and a femto eNB, and the interference message is broadcast for each identified unprotected and usable subframe.

26. The computer program product of claim 23, wherein:

the interference message comprises an overload indicator (OI); and the interference comprises interference-over-thermal (IoT).

27. The computer program product of claim 23, further comprising:
program code to communicate a low interference message when the measured interference associated with the identified unprotected and usable subframe falls below the threshold value.

28. A computer program product for wireless communications in a wireless network by an evolved Node B (eNB) that transmits on a frequency band, comprising:
a non-transitory computer-readable medium having program code recorded thereon, the program code comprising:
program code to receive an interference message broadcast by a neighboring eNB;
program code to determine a subframe type of each subframe of a plurality of time-domain subframes to be protected or unprotected, wherein a protected subframe is assigned to the eNB for use by the eNB and restricted from use by the neighboring eNB that transmits on the frequency band used by the eNB; and program code to trigger inter-cell interference coordination (ICIC) actions that constrain resource allocations or power levels of data transmissions, based on the interference message in response to the subframe type being determined to be unprotected, wherein an unprotected subframe is assigned to the eNB and the neighboring eNB for transmitting data, and wherein the interference message is based on a measured interference including a first average of interference measurements for protected subframes of the plurality of time-domain subframes and a second average of interference measurements for unprotected and usable subframes of the plurality of time-domain subframes.

29. The computer program product of claim 28, furthering comprising:
program code to ignore the interference message in response to the subframe type being determined to be protected.

30. The computer program product of claim 28, wherein the interference message comprises one of:
an overload indicator (OI);
a high interference indicator (HII); and
a relative narrowband transmission power (RNTP) message.

31. The computer program product of claim 30, wherein the interference message comprises the RNTP message, and further comprising:
program code to trigger ICIC actions based on the interference message in response to the subframe type being determined to be protected, wherein the ICIC actions are performed for at least one of a data channel and a control channel.

32. The computer program product of claim 28, further comprising:
program code to trigger ICIC actions based on the interference message for control channel signaling for one or more subframes determined to be protected.

33. An apparatus configured for wireless communication of an evolved Node B (eNB) that transmits on a frequency band, comprising
at least one processor; and
a memory coupled to the at least one processor, wherein the at least one processor is configured:
to measure interference over a plurality of subframes including at least one protected subframes and at least one unprotected subframes, wherein the at least one protected subframes are assigned to the eNB for use by the eNB and restricted from use by a neighboring eNB that transmits on the frequency band used by the eNB;
to identify at least one unprotected and usable subframe from said at least one unprotected subframes, said at least one unprotected and usable subframe being at least one subframe assigned to the eNB and the neighboring eNB for transmitting data, wherein the configuration of the at least one processor to measure interference over the plurality of subframes includes configuration to:
average interference measurements for the at least one protected subframes of the plurality of subframes; and
average interference measurements for all unprotected and usable subframes of the plurality of subframes on which the eNB can one or more of: receive data and transmit data,
wherein the measured interference associated with the identified unprotected and usable subframe comprises said average of the interference measurements for all unprotected and usable subframes of the plurality of subframes; and
to communicate an interference message pertaining to the frequency band when the measured interference associated with the identified at least one unprotected and usable subframe exceeds a threshold value.

34. The apparatus of claim 33, wherein the configuration to measure includes configuration of the at least one processor:
to maintain a separate interference measurement for each of the plurality of subframes, wherein the interference associated with the identified unprotected and usable subframe comprises the separate interference measurement measured for the identified unprotected and usable subframe.

35. The apparatus of claim 33, wherein the eNB comprises one of: a pico eNB and a femto eNB, and the interference message is broadcast for each identified unprotected and usable subframe.

36. The apparatus of claim 33, wherein:
the interference message comprises an overload indicator (OO); and
the interference comprises interference-over-thermal (IoT).

37. The apparatus of claim 33, wherein the at least one processor is further configured:
to communicate a low interference message when the measured interference associated with the identified unprotected and usable subframe falls below the threshold value.

38. An apparatus configured for wireless communication of an evolved Node B (eNB) that transmits on a frequency band, comprising
at least one processor; and
a memory coupled to the at least one processor, wherein the at least one processor is configured:
to receive an interference message broadcast by a neighboring eNB;
to determine a subframe type of each subframe of a plurality of time-domain subframes to be protected or unprotected, wherein a protected subframe is assigned to the eNB for use by the eNB and restricted from use by the neighboring eNB that transmits on the frequency band used by the eNB; and
to trigger inter-cell interference coordination (ICIC) actions that constrain resource allocations and power levels of data transmissions, based on the interference message in response to the subframe type being determined to be unprotected, wherein an unprotected subframe is assigned to the eNB and the neighboring eNB for transmitting data, and wherein the interference message is based on a measured interference including a first average of interference measurements for protected subframes of the plurality of time-domain subframes and a second average of interference measurements for unprotected and usable subframes of the plurality of time-domain subframes.

39. The apparatus of claim 38, wherein the at least one processor is further configured:

to ignore the interference message in response to the subframe type being determined to be protected.

40. The apparatus of claim 38, wherein the interference message comprises one of:

an overload indicator (OI);

a high interference indicator (HII); and a relative narrowband transmission power (RNTP) message.

41. The apparatus of claim 40, wherein the interference message comprises the RNTP message, and wherein the at least one processor is further configured:

to trigger ICIC actions based on the interference message in response to the subframe type being determined to be protected, wherein the ICIC actions are performed for at least one of: a data channel and a control channel.

42. The apparatus of claim 38, wherein the at least one processor is further configured:

to trigger ICIC actions based on the interference message for control channel signaling for one or more subframes determined to be protected.

* * * * *